United States Patent
Breakstone et al.

(10) Patent No.: US 10,114,784 B2
(45) Date of Patent: Oct. 30, 2018

(54) STATISTICAL POWER HANDLING IN A SCALABLE STORAGE SYSTEM

(71) Applicant: Liqid Inc., Lafayette, CO (US)

(72) Inventors: Jason Breakstone, Broomfield, CO (US); Christopher Long, Colorado Springs, CO (US)

(73) Assignee: Liqid Inc., Broomfield, CO (US)

( * ) Notice: Subject to any disclaimer, the term of this patent is extended or adjusted under 35 U.S.C. 154(b) by 147 days.

(21) Appl. No.: 14/694,732

(22) Filed: Apr. 23, 2015

(65) Prior Publication Data

US 2015/0309952 A1    Oct. 29, 2015

Related U.S. Application Data

(60) Provisional application No. 61/984,193, filed on Apr. 24, 2014, provisional application No. 61/984,199, (Continued)

(51) Int. Cl.
  *G06F 13/40* (2006.01)
  *G06F 3/06* (2006.01)
  (Continued)

(52) U.S. Cl.
  CPC .......... *G06F 13/4022* (2013.01); *G05B 11/01* (2013.01); *G06F 3/0617* (2013.01); *G06F 3/0625* (2013.01); *G06F 3/0634* (2013.01); *G06F 3/0658* (2013.01); *G06F 3/0688* (2013.01); *G06F 3/0689* (2013.01); *G06F 11/00* (2013.01); *G06F 11/3034* (2013.01); (Continued)

(58) Field of Classification Search
  None
  See application file for complete search history.

(56) References Cited

U.S. PATENT DOCUMENTS 5,828,207 A    10/1998    Saadeh
6,061,750 A    5/2000    Beardsley et al.
(Continued)

OTHER PUBLICATIONS

Juan L. Aragon, et al.; "Control Speculation for Energy-Efficient Next-Generation Superscalar Processors;" IEEE Transactions on Computers; Mar. 2006; pp. 281-291; vol. 55, No. 3; IEEE Computer Society.

(Continued)

*Primary Examiner* — Scott Sun

(57) ABSTRACT

Systems, methods, apparatuses, and software for data storage systems are provided herein. In one example, a data storage assembly is provided that includes a plurality of storage drives each comprising a PCIe host interface and solid state storage media. The data storage assembly includes a PCIe switch circuit coupled to the PCIe host interfaces of the storage drives and configured to receive storage operations issued by one or more host systems over a shared PCIe interface and transfer the storage operations for delivery to the storage drives over selected ones of the PCIe host interfaces. The data storage assembly includes a control processor configured to monitor usage statistics of the storage drives, and power control circuitry configured to selectively remove the power from ones of the storage drives based at least on the usage statistics of the storage drives.

20 Claims, 10 Drawing Sheets

Related U.S. Application Data filed on Apr. 25, 2014, provisional application No. 61/984,207, filed on Apr. 25, 2014, provisional application No. 61/984,219, filed on Apr. 25, 2014.

(51) Int. Cl.

| | |
|---|---|
| *G06F 13/42* | (2006.01) |
| *G06F 11/00* | (2006.01) |
| *G05B 11/01* | (2006.01) |
| *G06F 11/30* | (2006.01) |
| *G06F 13/38* | (2006.01) |
| *G06F 11/14* | (2006.01) |
| *G06F 11/20* | (2006.01) |

(52) U.S. Cl.
CPC ...... *G06F 11/3058* (2013.01); *G06F 13/4221* (2013.01); *G06F 11/1441* (2013.01); *G06F 11/2015* (2013.01); *Y02D 10/14* (2018.01); *Y02D 10/151* (2018.01)

(56) References Cited

U.S. PATENT DOCUMENTS

| | | |
|---|---|---|
| 6,325,636 B1 | 12/2001 | Hipp et al. |
| 7,243,145 B1 | 7/2007 | Poortman |
| 7,260,487 B2 | 8/2007 | Brey et al. |
| 7,315,954 B2 | 1/2008 | Van Lieu et al. |
| 7,505,889 B2 | 3/2009 | Salmonsen et al. |
| 7,606,960 B2 | 10/2009 | Munguia |
| 7,725,757 B2 | 5/2010 | Padweka et al. |
| 7,877,542 B2 | 1/2011 | Chow et al. |
| 8,125,919 B1 | 2/2012 | Khanka et al. |
| 8,150,800 B2 | 4/2012 | Webman et al. |
| 8,656,117 B1 | 2/2014 | Wong et al. |
| 8,688,926 B2 | 4/2014 | Breakstone et al. |
| 8,880,771 B2 | 11/2014 | Subramaniyan et al. |
| 9,602,437 B1 | 3/2017 | Bernath |
| 2002/0059428 A1 | 5/2002 | Susai et al. |
| 2003/0110423 A1 | 6/2003 | Helms et al. |
| 2003/0126478 A1 | 7/2003 | Burns et al. |
| 2005/0223136 A1 | 10/2005 | Tanaka et al. |
| 2006/0277206 A1 | 12/2006 | Bailey et al. |
| 2007/0067432 A1 | 3/2007 | Tarui et al. |
| 2008/0034153 A1 | 2/2008 | Lee et al. |
| 2008/0198744 A1 | 8/2008 | Menth |
| 2008/0281938 A1 | 11/2008 | Rai et al. |
| 2009/0006837 A1 | 1/2009 | Rothman et al. |
| 2009/0100280 A1 | 4/2009 | Lindsay |
| 2009/0190427 A1 | 7/2009 | Brittain et al. |
| 2009/0193201 A1 | 7/2009 | Brittain et al. |
| 2009/0193203 A1 | 7/2009 | Brittain et al. |
| 2009/0216910 A1 | 8/2009 | Duchesneau |
| 2009/0276551 A1 | 11/2009 | Brown et al. |
| 2010/0088467 A1 | 4/2010 | Lee et al. |
| 2011/0289510 A1 | 11/2011 | Lin et al. |
| 2011/0299317 A1 | 12/2011 | Shaeffer et al. |
| 2011/0320861 A1 | 12/2011 | Bayer et al. |
| 2012/0030544 A1 | 2/2012 | Fisher-Jeffes |
| 2012/0089854 A1 | 4/2012 | Breakstone et al. |
| 2012/0151118 A1* | 6/2012 | Flynn ................ G06F 11/1008 711/6 |
| 2012/0166699 A1 | 6/2012 | Kumar et al. |
| 2012/0210163 A1 | 8/2012 | Cho |
| 2012/0317433 A1 | 12/2012 | Ellis et al. |
| 2013/0132643 A1 | 5/2013 | Huang |
| 2013/0185416 A1 | 7/2013 | Larkin et al. |
| 2014/0047166 A1 | 2/2014 | Asnaashari et al. |
| 2014/0056319 A1 | 2/2014 | Hellwig |
| 2014/0059265 A1 | 2/2014 | Iyer et al. |
| 2014/0075235 A1 | 3/2014 | Chandhoke et al. |
| 2014/0103955 A1 | 4/2014 | Avritch et al. |
| 2014/0108846 A1 | 4/2014 | Berke et al. |
| 2014/0365714 A1 | 12/2014 | Sweere et al. |
| 2015/0074322 A1 | 3/2015 | Galles |
| 2015/0121115 A1 | 4/2015 | Chandra et al. |
| 2015/0186437 A1 | 7/2015 | Molaro |
| 2015/0212755 A1* | 7/2015 | Asnaashari ........... G06F 3/0629 711/103 |
| 2015/0304423 A1 | 10/2015 | Satoyama et al. |
| 2015/0373115 A1 | 12/2015 | Breakstone et al. |
| 2016/0197996 A1 | 7/2016 | Barton et al. |
| 2016/0248631 A1 | 8/2016 | Duchesneau |

OTHER PUBLICATIONS

Lu, Yingping et al., "Performance Study of iSCSI-Based Storage Subsystems," IEEE Communications Magazine, pp. 76-82, Aug. 2003.
International Application No. PCT/US2017/046602, International Search Report & Written Opinion, 8 pages, dated Oct. 19, 2017.
International Application No. PCT/US2017/046607, International Search Report & Written Opinion, 7 pages, dated Oct. 23, 2017.

* cited by examiner

STATISTICAL POWER HANDLING IN A SCALABLE STORAGE SYSTEM

RELATED APPLICATIONS

This application hereby claims the benefit of and priority to U.S. Provisional Patent Application 61/984,193, titled "SCALABLE STORAGE SYSTEM SLED ARCHITECTURE," filed Apr. 25, 2014, U.S. Provisional Patent Application 61/984,199, titled "SCALABLE STORAGE SYSTEM POWER DOWN HANDLING," filed Apr. 25, 2014, U.S. Provisional Patent Application 61/984,207, titled "SCALABLE STORAGE SYSTEM ARCHITECTURE WITH POWER REDISTRIBUTION," filed Apr. 25, 2014, and U.S. Provisional Patent Application 61/984,219, titled "SCALABLE STORAGE SYSTEM ARCHITECTURE AND STATISTICAL POWER HANDLING," filed Apr. 25, 2014, which are hereby incorporated by reference in their entirety.

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

In addition to physical space limitations, these bulk storage systems have been traditionally limited in the number of devices that can be included per host, which can be problematic in storage environments where higher capacity, redundancy, and reliability is desired. These shortcomings can be especially pronounced with the increasing data storage and retrieval needs in networked, cloud, and enterprise environments.

Overview

Systems, methods, apparatuses, and software for data storage systems are provided herein. In one example, a data storage assembly is provided. The data storage assembly includes a plurality of storage drives each comprising a PCIe host interface and solid state storage media, with each of the storage drives configured to store and retrieve data responsive to storage operations received over an associated PCIe host interface. The data storage assembly includes a PCIe switch circuit coupled to the PCIe host interfaces of the storage drives and configured to receive the storage operations issued by one or more host systems over a shared PCIe interface and transfer the storage operations for delivery to the storage drives over selected ones of the PCIe host interfaces. The data storage assembly includes a control processor configured to monitor usage statistics of the plurality of storage drives, and power control circuitry configured to provide power to the plurality of storage drives and selectively remove the power from ones of the plurality of storage drives based at least on the usage statistics of the plurality of storage drives.

In another example, a method of operating a data storage assembly is provided. The method includes, in a plurality of storage drives each comprising a Peripheral Component Interconnect Express (PCIe) host interface and solid state storage media, storing and retrieving data responsive to storage operations received over an associated PCIe host interface. The method also includes, in a PCIe switch circuit coupled to the PCIe host interfaces of the plurality of storage drives, receiving the storage operations issued by one or more host systems over a shared PCIe interface and transferring the storage operations for delivery to the plurality of storage drives over selected ones of the PCIe host interfaces. The method also includes monitoring usage statistics of the plurality of storage drives, and providing power to the plurality of storage drives and selectively removing the power from ones of the plurality of storage drives based at least on the usage statistics of the plurality of storage drives.

In another example, a data storage module is provided. The data storage module includes a plurality of storage drives each configured to store and retrieve data responsive to storage operations received over associated host interfaces. The data storage module includes communication circuitry coupled to the host interfaces of the plurality of storage drives and configured to receive the storage operations issued by one or more host systems over a shared interface and transfer the storage operations for delivery to the plurality of storage drives over selected ones of the host interfaces. The data storage module includes power control circuitry configured to monitor usage statistics of the plurality of storage drives, and selectively remove power from ones of the plurality of storage drives based at least on the usage statistics of the plurality of storage drives.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
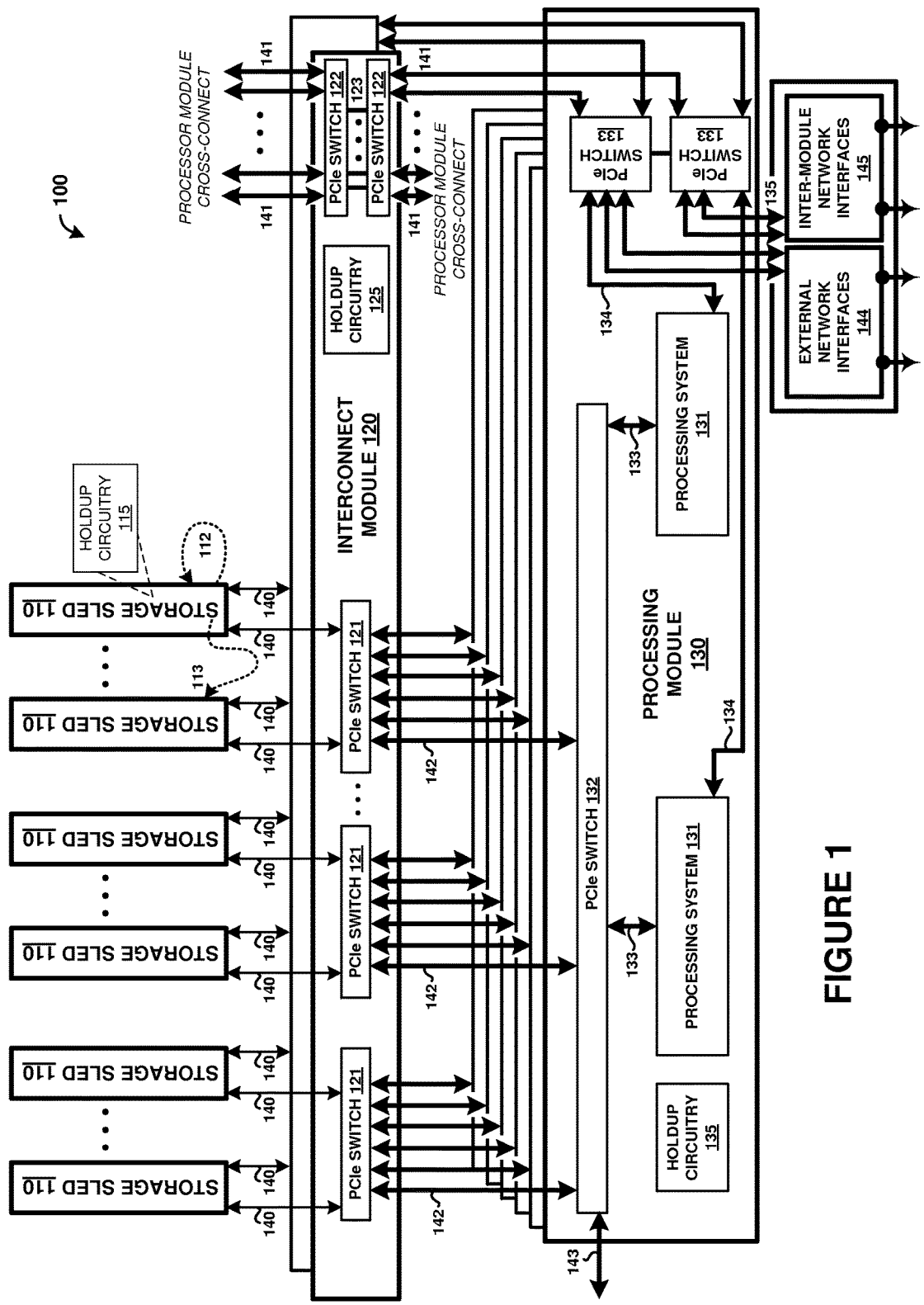
FIG. 1 is a system diagram illustrating a storage system.

FIG. 1 is a system diagram illustrating storage system 100. Storage system 100 includes three different module types in FIG. 1, namely storage sleds 110, interconnect modules 120, and processing modules 130. Although this example shows many storage sleds, 2 interconnect modules, and 6 processing modules. Any number of sleds or modules can be includes, such as 48 storage sleds or 64 storage sleds, along with a different number of interconnect or processing modules. Some examples can distribute functionality of each interconnect module 120 among two or more modules. Additionally, power supply modules and associated power and control distribution links can also be included, but are omitted in FIG. 1 for clarity.

A module typically comprises physical support structure and enclosure that includes circuitry, printed circuit boards, semiconductor systems, and structural elements. The modules are insertable and removable from a rackmount style of enclosure. In some examples, the elements of FIG. 1 are included in a 3U chassis for mounting in a larger rackmount environment. It should be understood that the elements of FIG. 1 can be included in any physical mounting environment, and need not include any associated enclosures or rackmount elements.

Holdup circuitry 115 is included on each sled 110 to provide power to the associated sled when input power has been lost or removed for the sled. In some examples, the sled is removed from an associated mating connector and input power is lost due to the removal. In other examples, power is lost to system 100, such as during a facility power outage or when an associated power supply fails. Similar holdup circuitry can be included on the other various modules of system 100. Specifically, holdup circuitry 125 is included on interconnect modules 120 and holdup circuitry 135 is included on processing modules 130.

Turning to the example of storage sled 110, the various holdup circuitry is also accompanied by a power controller circuit to selectively provide power to the elements of storage sled 110. The power controller can receive control instructions from a processor of storage sled 110 or from other processors or modules, such as over the Inter-Integrated Circuit (I2C), Ethernet, or Universal Serial Bus (USB) sideband interfaces discussed herein. Storage sled 110 can receive power over one or more power links as a power source for the various elements of storage sled 110. Holdup circuitry 115 includes energy storage devices for storing power received over the power link for use during power interruption events, such as loss of source power. Holdup circuitry 115 can include capacitance storage devices, such as an array of capacitors. Further discussion of examples of power control circuitry is found below.

As seen in FIG. 1, storage sleds 110 can each provide self-power during power interruption events, as noted by element 112. Also, storage sleds 110 can each redistribute power to other storage sleds, as noted by element 113. This redistributed power can be transferred to other storage sleds 110 or to other modules in FIG. 1, such as interconnect module 120 or processing module 130. Typically, a storage sled will use any associated holdup power to commit in-flight write data associated with pending write operations before power down of the associated sled. The in-flight write data can be committed to storage drives of the associated storage sled, or can be committed to other non-volatile memory such as a non-volatile write cache which can hold write data until power is restored. In-flight write operations can also be held in non-volatile memory of interconnect module 120 or processing module 130 if the write operations have not yet reached an associated storage sled. Once any in-flight write data has been committed to non-volatile memory, then excess or remaining holdup power can be redistributed to other modules. In some examples, no pending write operations are present when input power is lost, and a larger amount of excess power is available on a particular storage sled. This excess power can be redistributed to a different storage sled to aid that sled in commit processes for associated write operations. Advantageously, excess holdup power of one sled or module can be used to power operations of another sled or module during power interruptions.

A plurality of storage sleds 110 are included in system 100. Each storage sled 110 includes one or more storage drives, such as four each shown in FIG. 3. Each storage sled 110 also includes Peripheral Component Interconnect Express (PCIe) switches, processors, and control system elements. PCIe switches of each storage sled 110 communicate with one or more on-sled storage drives over associated PCIe links. PCIe switches of each storage sled 110 also are communicatively coupled to an on-sled processor or control system for traffic statistics retrieval and status monitoring, among other operations. PCIe switches of each storage sled 110 communicate over one or more PCIe links 140 with an associated PCIe switch 121 of an interconnect module 120.

Each PCIe switch 121 of interconnect modules 120 communicate over associated PCIe links 142 with associated PCIe switch 132 of one or more processing modules 130. PCIe switch 132 communicates with one or more associated processing systems 131 as well as over one or more cross-connect PCIe links 143. Interconnect modules 120 also each include a plurality of PCIe switches 122 for interconnecting processor modules, such as processor modules 130. PCIe switches 122 are included for processor module cross-connect, and communicate with ones of PCIe switches 133 in associated processing modules 130 over processor module cross-connect links 141. PCIe switches 133 communicate with ones of processing systems 131 over PCIe links 134.

In the example in FIG. 1, PCIe switches 121 and 132 (and associated PCIe links) are included in a data plane of system 100, and used for carrying storage data between storage sleds 110 and processing modules 130. PCIe switches 122 and 133 (and associated PCIe links) are included in a control plane of system 100, and used for carrying user control data and control signaling between processing modules.

Each processing module 130 communicates over one or more PCIe links 135 through PCIe switches 133 with external expansion cards or external PCIe ports. In some examples, the external expansion cards include network interface cards for communicating over TCP/IP networks or carrying iSCSI traffic, among other network traffic types. These packet links are illustrated by packet network links 144. External access to storage system 100 is provided over ones of packet network links 144, such as for end user access to data stored on storage sleds 110.

Each processing module 130 can also communicate with other processing modules, such as those in other storage assemblies or 3U enclosures, over one or more inter-module packet network interfaces 145. In some examples, inter-module packet network interfaces 145 include network interface cards for communicating over Ethernet or TCP/IP (Transmission Control Protocol (TCP)/Internet Protocol) networks for exchanging storage packets between processing modules. Further operation of inter-module storage packet exchange over Ethernet is discussed in the examples herein.

The PCIe switches discussed herein can comprise PCIe crosspoint switches, which logically interconnect various ones of the associated PCIe links based at least on the traffic carried by each PCIe link. Each PCIe switch port can comprise a non-transparent (NT) or transparent port. An NT port can allow some logical isolation between endpoints, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. In other examples, a domain-based PCIe signaling distribution can be included which allows segregation of PCIe ports of a PCIe switch according to user-defined groups.

PCIe can support multiple bus widths, such as ×1, ×4, ×8, ×16, and ×32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. Although PCIe is used in FIG. 1, it should be understood that different communication links or busses can instead be employed, such as Ethernet, Serial Attached SCSI (SAS), FibreChannel, Thunderbolt, Serial Attached ATA Express (SATA Express), among other interconnect, network, and link interfaces. Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

In FIG. 1, any processing system 131 on any processing module 130 has logical visibility to all storage drives in all storage sleds 110. Any processing system 131 can transfer data for storage on any storage drive and retrieve data already stored on any storage drive. Thus, 'm' number of storage drives can be coupled with 'n' number of processors to allow for a large, scalable architecture with a high-level of redundancy and density.

To provide visibility of each processing system 131 to any storage sled 110, various techniques can be employed. In a first example, a particular processing system 131 manages (instantiates/binds) a subset number of the total quantity of storage sleds, such as 16 storage drives spanning 4 storage sleds, and handles transactions for that subset of storage drives, such as read and write transactions. Each processing system 131, however, has memory-mapped visibility to the storage drives managed by any other processing system 131. When a transaction is desired for a storage drive not managed by a particular processing system, the particular processing system uses the memory mapped access to all storage drives for that transaction. The transaction can be transferred and transitioned to the appropriate processing system that manages that storage drive associated with the data of the transaction. The control plane, namely PCIe switches 122 and 133 are used to transfer data between processing systems so that a particular processing system or processor can store the data in the storage sled or sleds that is managed by that particular processing system, even though the data might be received over a network interface associated with a different processing system.

In operation, such as a write operation, data can be received over any network interface 144 by any processing system 131 of any processing module 130. For example, the write operation can be a write operation received over network link 144 from an end user employing an iSCSI protocol. The processing system that receives the write operation determines if it physically manages the storage drive or drives associated with the write operation, and if it does, then the processing system transfers the data for storage on the associated storage drives over data plane PCIe links 133. If the processing system determines that it does not physically manage the storage drive or drives associated with the write operation, then the processing system transfers the write operation to another processing sled that includes the processing system that does manages the storage drive or drives over cross connect links 134. Data striping can be employed by any processing system to stripe data for a particular write transaction over any number of storage drives, such as over all of the storage sleds that include storage drives managed by the particular processing system.

In this example, the PCIe interfaces associated with each processing system 131 have 64-bit address spaces, which allows an addressable space of $2^{64}$ bytes, leading to at least 16 exbibytes of byte-addressable memory. The 64-bit PCIe address space can shared by all processing systems 131 for memory mapping to storage drives on storage sleds. Thus, while each particular processing system 131 actually manages a subset of the total storage drives on storage sleds, all processors 131 have visibility to, and can initiate read/write transactions to, any of storage drives on storage sleds. A managing processing system 131 that manages a particular storage drives on storage sleds receives write/read transactions and any associated data from an initiating processing system 131 by at least using the memory mapped PCIe address space.

Figure 2:
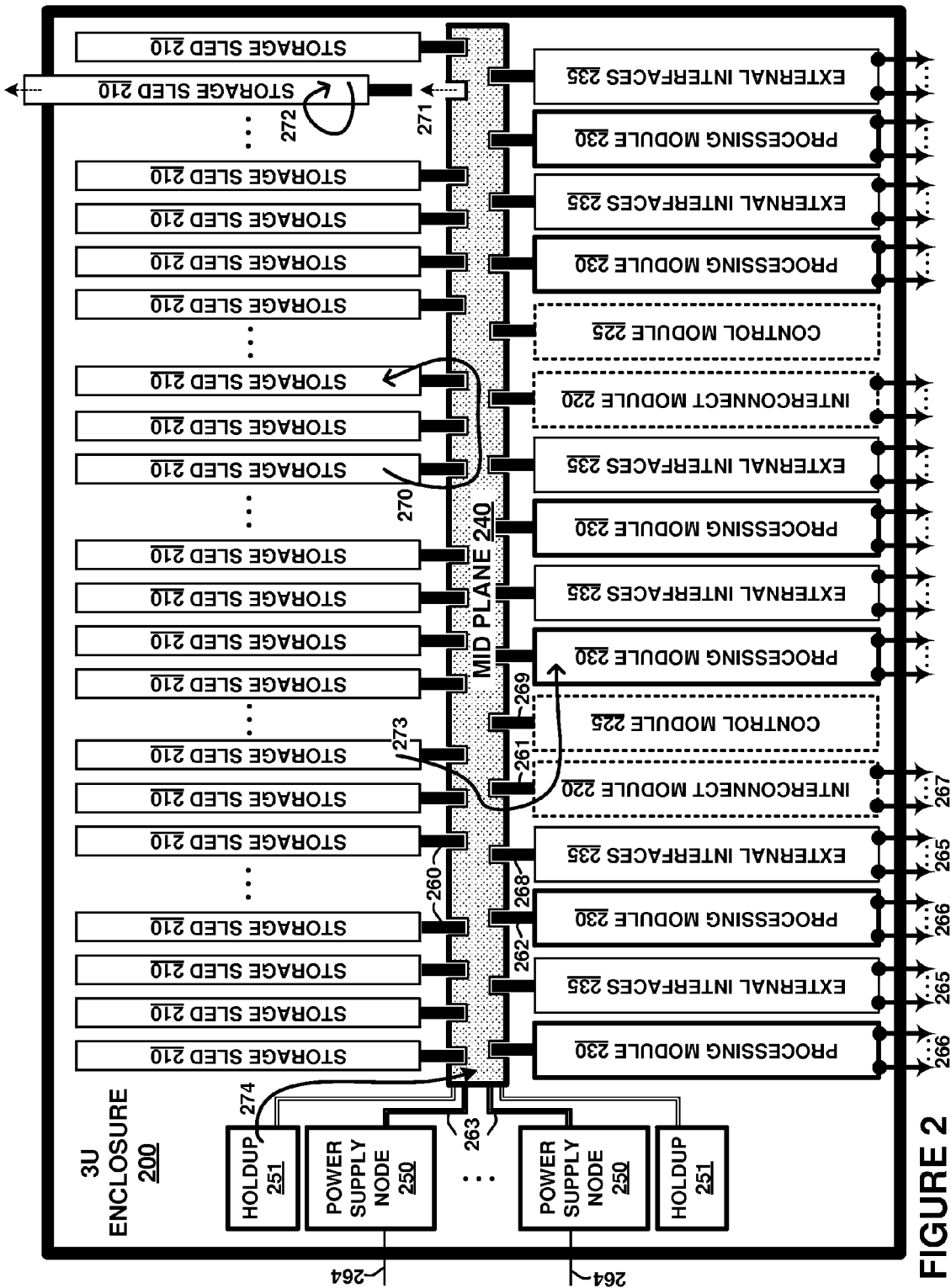
FIG. 2 is a block diagram illustrating a storage system.

FIG. 2 is a block diagram illustrating a storage system. The elements of FIG. 2 are shown as physically mated to midplane 240. Midplane 240 includes a chassis and a plurality of physical connectors for mating with any associated storage sleds 210, interconnect modules 220, processing modules 230, or external interfaces 235. Midplane 240 comprises one or more printed circuit boards, connectors, physical support members, chassis elements, structural elements, and associated links as metallic traces or optical links for interconnecting the various elements of FIG. 2. Midplane 240 can function as a backplane, but instead of having sleds or modules mate on only one side as in backplane examples, midplane 240 has sleds or modules that mate on at least two sides. Elements of FIG. 2 can correspond to similar elements of FIG. 1, such as storage sled 110, interconnect module 120, processing module 130, and the expansion/external connectors, although variations are possible.

FIG. 2 shows all elements included in a 3U enclosure 200. The enclosure can instead be of any multiple of a standardized computer rack height, such as 1U, 2U, 3U, 4U, and the like, and can include associated chassis, physical supports, cooling systems, mounting features, cases, and other enclosure elements. Typically, each sled or module will fit into associated groove features included in a chassis portion of enclosure 200 to slide into a predetermined slot and guide an edge connector associated with each sled to mate with an associated socket connector on midplane 240. Storage sleds 210 each have an associated connector 260. Interconnect modules 220 each have an associated connector 261. Interconnect modules 220 also each have one or more cluster interconnect links 267, which in this example are PCIe links. Cluster interconnect links 267 are employed to interconnect 3U enclosures between each other using PCIe links. Control modules 225 each have an associated connector 269. In some examples, ones of control modules 225 and interconnect modules 220 are included in the same module. Processing modules 230 each have an associated connector 262. Processing modules 230 each have one or more associated external links 266 for communicating with external systems, such as management systems, end user devices, or other computing systems, including other enclosures similar to enclosure 200. External links 266 can comprise Ethernet, SFP+, or other links and connectors. External interfaces module 235 each have an associated connector 268. External interfaces 235 provide external access to the storage contents of enclosure 200, such as for end user devices or external systems. Network links 265 can be provided by external interfaces 235, which can comprises Ethernet, TCP/IP, Infiniband, iSCSI, or other external interfaces. In operation, external interfaces 235 each is communicatively coupled with an associated processing module, as pictured in FIG. 2. Enclosure 200 enables hot-swapping of any of the sleds and can include other features such as power lights, activity indicators, external administration interfaces, and the like.

Figure 6:
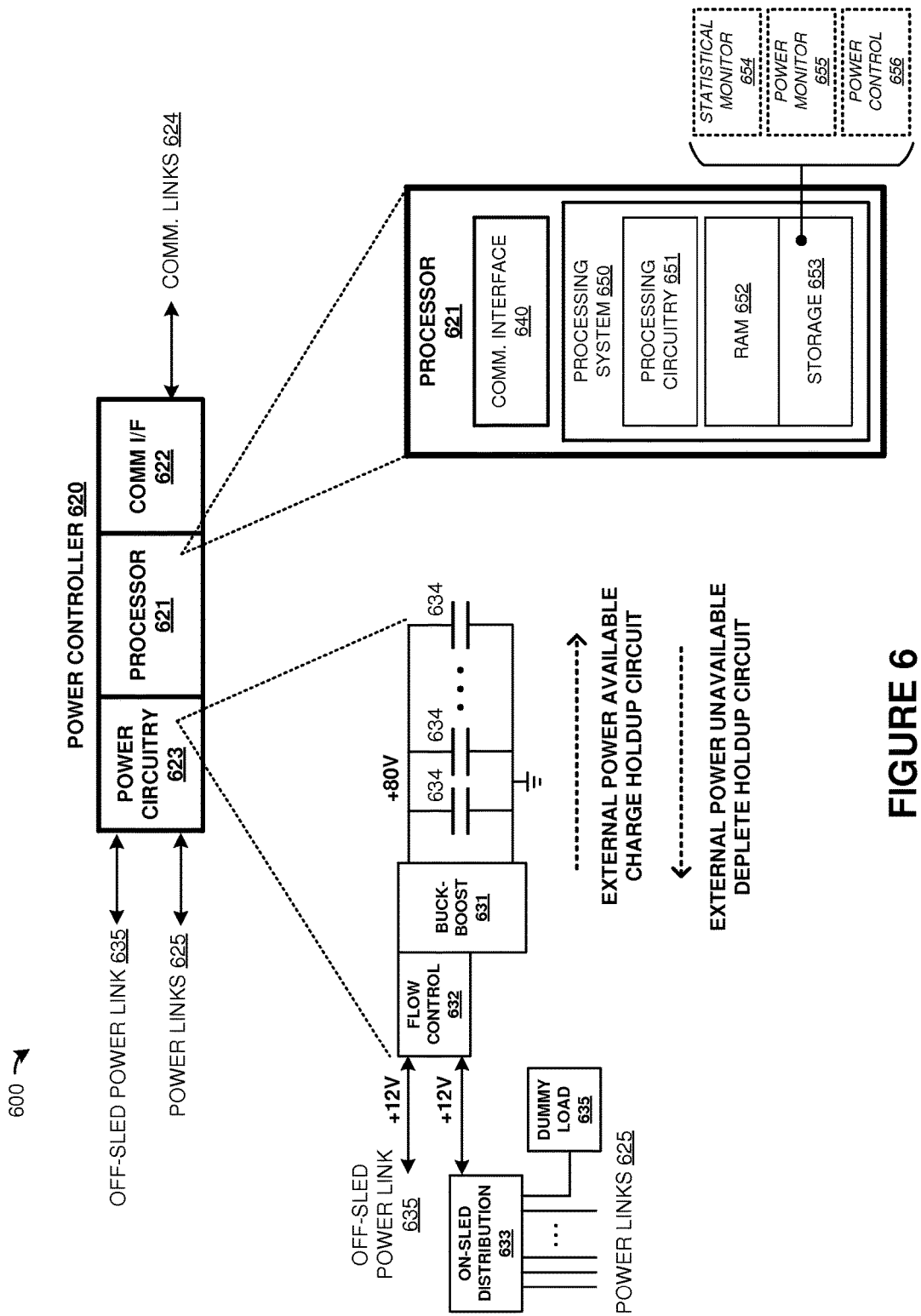
FIG. 6 is a block diagram illustrating a power control system.

In some examples, enclosure 200 includes a chassis and midplane that can accommodate a flexible configuration and arrangement of sleds and associated circuit cards. Although FIG. 2 illustrates storage sleds mating on one side of midplane 240 and various modules mating on another side of midplane 240, it should be understood that other configurations are possible. Enclosure 200 can include a chassis to accommodate any of the following configurations, either in front-loaded or rear-loaded configurations:

48 or more sleds that contain four M.2 SSDs each
  24 or more sleds containing 2×HHHL cards (half-height half-length PCIe cards) that can comprise PCIe storage cards, PCIe network adaptors, or host bus adaptors
  12 or more sleds with 2×FHHL cards (full-height half-length PCIe cards) that can comprise graphics cards or graphics processing units (GPUs)
  6 or more sleds with 1×PCIe cards (full-height full-length PCIe cards) that comprise processing modules, which can comprise NVIDIA Tesla or Intel Phi processor cards
  24 or more sleds containing 4×2.5-inch PCIe SSDs
  interconnect modules, interposer modules, and control modules Additionally, power and associated power control signaling for the various sleds of enclosure 200 is provided by one or more power supply nodes 250 over associated links 263. Although power supply nodes 250 are shown as included in enclosure 200 in FIG. 2, it should be understood that power supply nodes 250 can instead be included in separate enclosures, such as separate 1U enclosures. Each power supply node 250 also includes power link 264 for receiving power from power sources, such as AC or DC input power. Additionally, power holdup circuitry can be included in holdup modules 251 which can deliver holdup power over links 274 responsive to power loss over link 264 or from a failure of power supply nodes 350. Examples of this power holdup circuitry is shown in FIG. 6.

Power holdup circuitry can be included on each sled or module of FIGS. 1 and 2. This power holdup circuitry can be used to provide interim power to the associated sled or module during power interruptions, such as when main input or system power is lost from a power source. Additionally, during use of holdup power, processing portions of each sled or module can be employed to selectively power down portions of each sled according to usage statistics, among other considerations. This holdup circuitry can provide enough power to commit in-flight write data during power interruptions or power loss events. These power interruption and power loss events can include loss of power from a power source, or can include removal of a sled or module from an associated socket or connector on midplane 240. The holdup circuitry can include capacitor arrays, supercapacitors, ultra-capacitors, batteries, fuel cells, flywheels, or other energy storage components, along with any associated power control, conversion, regulation, and monitoring circuitry. Further operations during power events are discussed below, such as in FIG. 6.

Storage sleds 210 or any of the insertable modules in FIG. 2 can each provide self-power during power interruption events. Also, storage sleds 210 can each redistribute power to other storage sleds or modules. This redistributed power can be transferred to other storage sleds 210 or to other modules in FIG. 2, such as interconnect module 220, control module 225, processing module 230, or external interfaces 235. Once any in-flight write data has been committed to non-volatile memory of a storage sled, then excess or remaining holdup power can be redistributed to other modules. In a first example power is lost to 3U enclosure 200, such as loss of input power over links 264 or failure of power supplies 250, among other failures or loss. In this example, storage sleds 210 can self-power for a period of time or redistribute power to other modules or sleds. In example operation 270, one storage sled 210 transfers holdup power to another of storage sleds 210, such as over power links of the associated modules. In another example operation 273, storage sled 210 transfers power to a processing module or interconnect module, among others. This redistribution of power from storage sleds or other modules for use by other storage sleds or other modules can occur over a shared power link or power bus included in midplane 240. Directional control of power flow can be provided by circuitry in each module or sled which allows the associated module to receive input power or to redistribute power over the same power link. Examples of this circuitry are shown in FIG. 6.

In another example, as noted by operation 271, a storage sled is removed from midplane 240 and thus has any input power lost due to physical removal. The removed storage sled can detect removal, such as by using pull-up or pull-down resistors, detection pins, link capacitance or impedance detection, or detection of loss of input power, among other detection methods. If in-flight write data has not yet been committed during loss of power, then associated holdup circuitry can power the removed storage sled, as noted by operation 272. In sled removal examples, redistribution of power to other sleds or modules is not likely due to removal and thus remaining holdup power not redistributed to other sleds or modules. Instead, excess or remaining holdup power can be bled off to an associated power sink. This power sink can include a bleed resistor or resistor array which converts the excess holdup power to heat. In other examples, one or more indicator lights can be included in bleed-off circuitry and the indicator lights can remain lit during a bleed off procedure to indicate power remains on the sled as well as to bleed power by powering the indicator lights. Once the sled is reinserted into midplane 240, input power is restored and the sled can receive power from midplane 240 as well as charge any holdup circuitry for the next power loss event.

Figure 3:
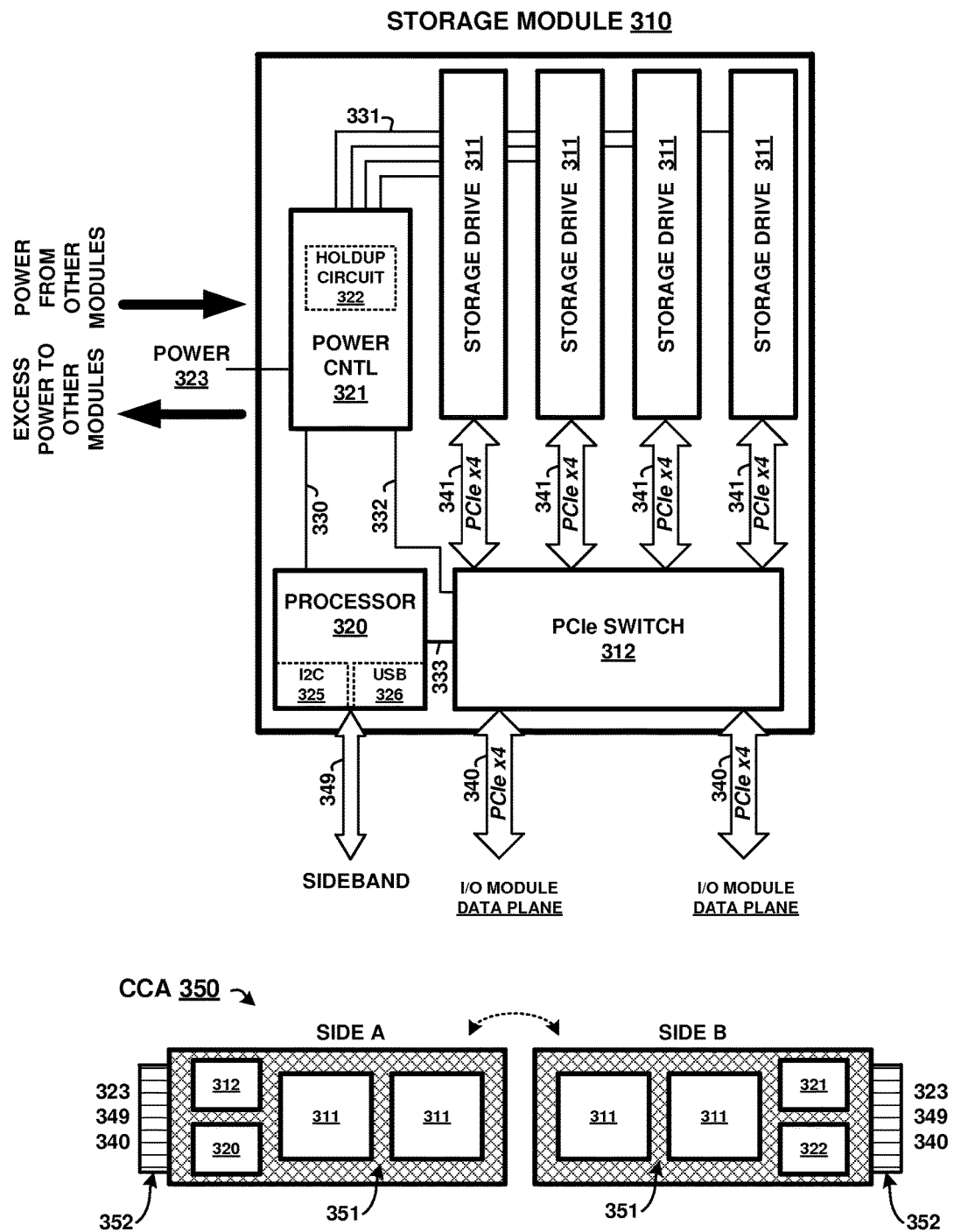
FIG. 3 is a block diagram illustrating a storage module.

FIG. 3 illustrates a block diagram of storage module 310, as an example of any of storage sleds 110 of FIG. 1. FIG. 3 also illustrates an example physical configuration of storage module 310 as shown for circuit card assembly 350. Storage module 310 includes four storage drives 311, PCIe switch 312, processor 320, power control module 321, and holdup circuit 322. Power control module 321 distributes power to each element of storage module 310 over associated power links 330-332. Power control module 321 can selectively enable/disable power for each power link. Further communication links can be included for intra-sled communication between the various elements of storage module 310.

PCIe switch 312 communicates with an interconnect module (not pictured) over links 340. Links 340 are included in a data plane for transferring user data, such as that discussed for FIG. 1. Each of links 340 comprises a PCIe link with four lanes, namely a "×4" PCIe link. More than one PCIe link 340 is provided for load balancing, redundancy, and failover protection for storage module 310. In some examples, PCIe switch 312 has links 340 connected to non-transparent (NT) interfaces or ports, where one or more host systems (such as a processor on a processing module) can interact with storage drives 311 in a redundant or failover configuration. PCIe switch 312 also communicates with four storage drives 111 over associated ×4 PCIe links 341.

Processor 320 communicates over at least sideband links 349. Sideband links 349 can include Universal Serial Bus (USB), SMBus, JTAG, Inter-Integrated Circuit (I2C), controller area network bus (CAN), or any other communication interface, and in some examples is provided over portions of PCIe links 340. In this example, processor 320 includes I2C interface 325 and USB interface 326 for communication over sideband links 349. I2C interface 325 and USB interface 326 can be included in separate circuitry or included in similar elements as processor 320. Processor 320 and PCIe switch 312 can communicate over an associated communication link 333, which can be an I2C or a PCIe link, among other link types.

Each storage drive 311 comprises a solid state drive (SSD) in this example, and communicates with external systems over an associated PCIe interface included in each storage drive 311. The solid state storage media of storage drives 311 can comprise flash memory, static RAM, NAND flash memory, NOR flash memory, memristors, or other solid state media. Instead of or in addition to solid state media, each storage drive 311 can comprise magnetic storage, such as hard disk drives, tape drives, magnetoresistive memory devices, and the like, or can comprise optical storage, such as phase change memory. Each storage drive 311 can receive read transactions and write transactions issued by a host system, such as a processor of a processing sled node. Responsive to a read transaction, storage drive 311 can retrieve data identified by the read transaction and transfer the data for delivery to the associated host. Responsive to a write transaction, storage drive 311 can write data that accompanies the write transaction to storage media associated with storage drive 311.

In some examples, each storage drive 311 comprises a circuit card assembly (CCA) which is separate from CCA 350 and with a mini-PCI Express connector or other connector that interfaces with a connector on CCA 350. CCA 350 comprises one or more printed circuit boards 351 that couple to the various elements of storage module 310. In other examples, each storage drive 311 comprises one or more flash memory chips with a PCIe interface which is soldered onto CCA 350. In yet other examples, each storage drive 311 comprises one or more separate solid state disk drives or magnetic hard disk drives along with associated enclosures and circuitry. PCIe switch 312 comprises a PCIe cross connect switch for establishing switched connections between any PCIe interfaces handled by PCIe switch 312. In some examples, PCIe switch 312 comprises a PLX Technology PEX8725 10-port, 24 lane PCIe switch chip.

Processor 320 comprises one or more microprocessors, processing devices, multi-core processors, processing circuitry, or other processing system. Processor 320 can include one or more non-transitory memory devices, such as RAM, solid state storage, or other memory to store instructions that are executable by processor 320 to operate as discussed herein. In some examples, processor 320 comprises an ARM microcontroller, ARM microprocessor, field-programmable gate array (FPGA), application specific integrated circuit (ASIC), application specific processor, or other microprocessor or processing elements. Processor 320 can comprise any processing elements discussed below for processing system 510 of FIG. 5. Processor 320 can monitor usage statistics, traffic status, or other usage information through link 333. PCIe switch 312 can track this usage information during normal operation and data transfer with storage drives 311, and processor 320 can retrieve this usage information as needed over link 333.

Power control module 321 includes circuitry to selectively provide power to any of the elements of storage module 310. Power control module 321 can receive control instructions from processor 320 or over any of PCIe links 340. In some examples, power control module 321 comprises processing elements discussed above for processor 320, or is included in the elements of processor 320. Power control module 321 can receive power over power link 323 as a power source for the various elements of storage module 310. Holdup circuit 322 includes energy storage devices for storing power received over power link 323 for use during power interruption events, such as loss of source power. Holdup circuit 322 can include capacitance storage devices, such as an array of capacitors. Further discussion of examples of power control circuitry is found below.

As seen in FIG. 3, arrows indicate a bidirectional power flow over link 323. Power can be accepted by module 310 when input power is available, such as from a mating connector or midplane. Power can be redistributed to other modules by module 310 over link 323 when input power is not available, such as during power interruption events. When module 310 is removed from a mating connector, then power can be bled off into associated power sink circuitry. Although one power link 323 is shown, it should be understood that more than one link can be included, such as separate input and output links or separate links for different voltage levels.

Figure 4:
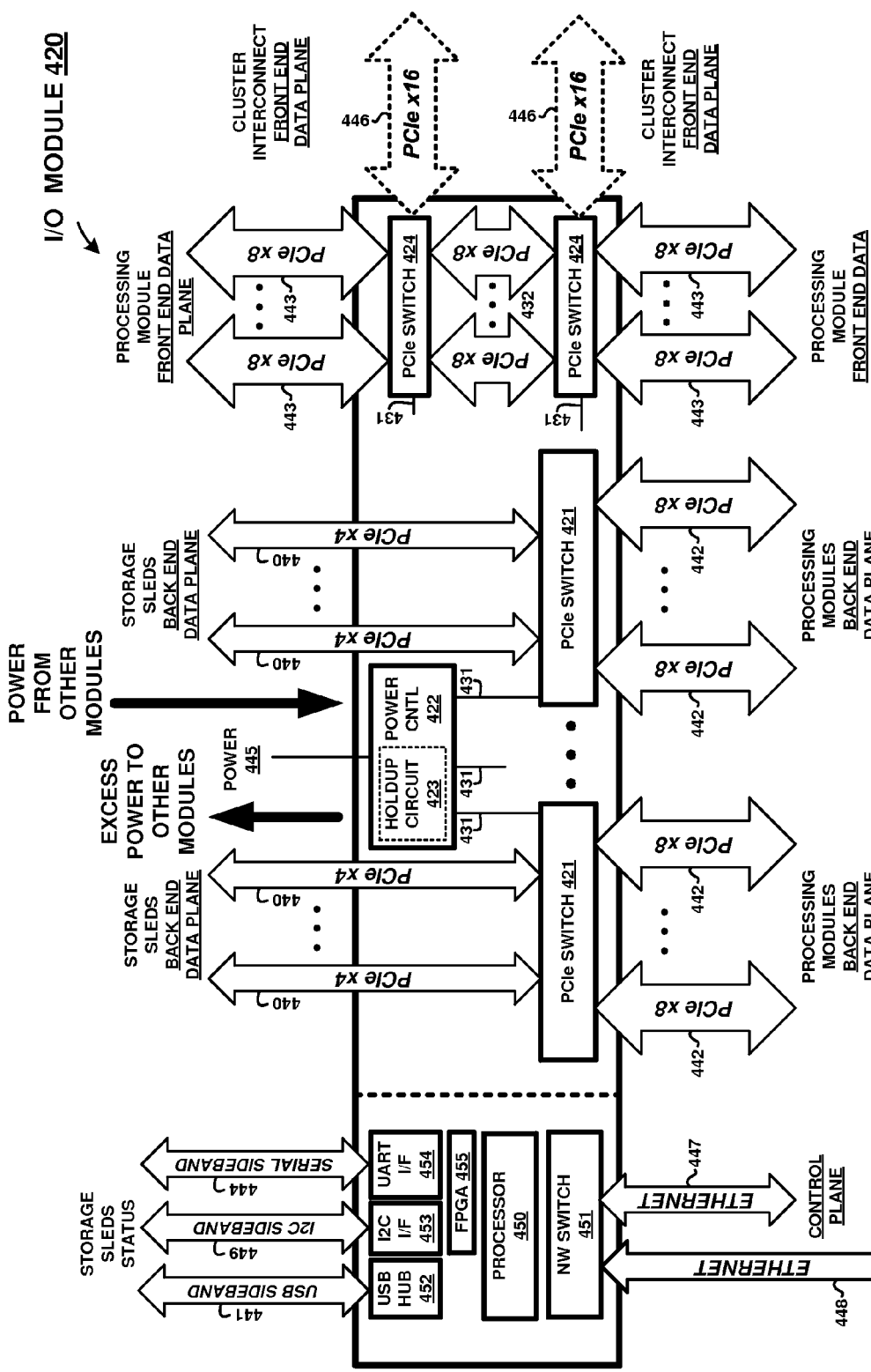
FIG. 4 is a block diagram illustrating control modules.

FIG. 4 is a block diagram illustrating input/output (I/O) module 420 as examples of interconnect module 120 of FIG. 1 or interconnection module 220 and control module 235 of FIG. 2. It should be understood that the elements of module 420 can be combined onto a single module, such as shown in FIG. 1, or included in separate modules.

I/O module 420 includes at least two data plane PCIe switches 421, at least two control plane PCIe switches 424, power control module 422, and holdup circuit 423. Power control module 422 distributes power to each element of I/O module 420 over associated power links 431-433. Power control module 422 can selectively enable/disable power for each power link. Further communication links can be included for intra-sled communication between the various elements of I/O module 420.

PCIe switches 421, PCIe links 440, and PCIe links 442 are included in a data plane, or back end, of a storage system, such as that illustrated in FIG. 1. Each PCIe switch 421 communicates with two or more storage sleds (not pictured) over PCIe links 440, and with two or more processing modules (not pictured) over PCIe links 442. Each of links 440 comprises a PCIe link with four lanes, namely a "×4" PCIe link. Each of links 442 comprises a PCIe link with eight lanes, namely a "×8" PCIe link. In some examples, each PCIe switch 421 communicates with six processing modules, such as shown in FIG. 1. Each PCIe link can also include sideband signaling, such as SMBus, JTAG, I2C, CAN, or any other communication interface, and in some examples is provided over separate links. Each PCIe switch 421 comprises a PCIe cross connect switch for establishing switched connections between any PCIe interfaces handled by each PCIe switch 421. In some examples, each PCIe switch 421 comprises a PLX Technology PEX8796 24-port, 96 lane PCIe switch chip.

PCIe switches 424 and PCIe links 443 are included in a control plane, or front end, of a storage system, such as that illustrated in FIG. 1. Each PCIe switch 424 communicates with many processing modules over PCIe links 443, and with each other over PCIe links 432. Each of links 443 and 432 comprises a PCIe link with eight lanes, namely a "×8" PCIe link. In some examples, each PCIe switch 424 communicates with six processing modules, such as shown in FIG. 1. Each PCIe link can also include sideband signaling, such as SMBus, JTAG, I2C, CAN, or any other communication interface, and in some examples is provided over separate links. Each PCIe switch 424 comprises a PCIe cross connect switch for establishing switched connections between any PCIe interfaces handled by each PCIe switch 424. In some examples, each PCIe switch 424 comprises a PLX Technology PEX8796 24-port, 96 lane PCIe switch chip.

Power control module 422 includes circuitry to selectively provide power to any of the elements of I/O module 420. Power control module 422 can receive control instructions from a processing module over any of PCIe links 442. In some examples, power control module 422 comprises processing elements discussed above for processor 320 of FIG. 3. Power control module 422 can receive power over power link 445 as a power source for the various elements of I/O module 420. Holdup circuit 423 includes energy storage devices for storing power received over power link 445 for use during power interruption events, such as loss of source power. Holdup circuit 423 can include capacitance storage devices, such as an array of capacitors. Further discussion of examples of power control circuitry is found below.

As seen in FIG. 4, arrows indicate a bidirectional power flow over link 445. Power can be accepted by module 420 when input power is available, such as from a mating connector or midplane. Power can be redistributed to other modules by module 420 over link 445 when input power is not available, such as during power interruption events. When module 420 is removed from a mating connector, then power can be bled off into associated power sink circuitry. Although one power link 445 is shown, it should be understood that more than one link can be included, such as separate input and output links or separate links for different voltage levels. Also, although only module 420 shows power control circuitry and holdup circuitry in FIG. 4, similar circuitry and power links can be included in other control or interposer modules when module 420 is comprised of separate modules.

I/O module 420 includes processor 450, network switch 451, USB hub 452, I2C interface 453, and universal asynchronous receiver/transmitter (UART) interface 454. Network switch 451 can include one or more Ethernet switches, including transceivers, transformers, isolation circuitry, buffers, and the like. USB hub 452 includes USB hub circuitry for fanning out a single host USB connection to many device USB links, and can include transceivers, processors, transformers, isolation circuitry, buffers, and the like.

Processor 450 includes one or more microprocessors or microcontrollers along with any associated storage memory. Processor 450 communicates with processing modules over Ethernet control plane links 447 and 448. Processor 450 communicates with data storage sleds over sideband links 441, 444, and 449 which can comprise USB links, I2C links, or serial links, among others. An interworking or interposing module can facilitate communication by processor 450 over any of the sideband links, such as though FPGA 455. FPGA 455 provides protocol translation between an interface of processor 405, such as Serial Peripheral Interfaces (SPI), and the various serial sideband interfaces. For example, FPGA 455 can convert communications received over an SPI interface from processor 450 to communications of I2C interface 453 or communications of UART interface 454. Likewise, FPGA 455 can convert communications received over the sideband interfaces and transfer over an interface to processor 450. FPGA 455 can handle fan-out and replication of various interface for communications to interface with more than one storage sled over the associated sideband interfaces.

Processor 450 initializes data storage sleds, such as discussed above for FIG. 1. Processor 450 accumulates statistical data and usage information for each storage sled in a storage system. Processing modules can retrieve this statistical data or usage information over Ethernet link 447 via network switch 451 from processing modules or over sideband links from data storage sleds. Ethernet link 447 comprises a control plane, which can be used for transferring control information and status information between processing modules. I/O module 420 also provides expansion of the control plane to other 3U enclosures for cluster control plane interconnect over Ethernet link 448.

PCIe switches 424 each include cluster interconnect interfaces 446 which are employed to interconnect further I/O modules of other storage systems. Interfaces 446 comprise PCIe links with 16 lanes, namely "×16" PCIe links. Cluster interconnect provides PCIe interconnect between external systems, such as other storage systems, over associated external connectors and external cabling. These connections can be PCIe links provided by any of the include PCIe switches, among other PCIe switches not shown, for interconnecting other I/O modules of other storage systems via PCIe links. The PCIe links used for cluster interconnect can terminate at external connectors. These connections can instead be PCIe links provided by any of the included PCIe switches, among other PCIe switches not shown, for interconnecting other interconnect modules of other storage systems via PCIe links. The PCIe links used for cluster interconnect can terminate at external connectors, such as mini-Serial Attached SCSI (SAS) connectors which are employed to carry PCIe signaling over mini-SAS cabling.

Figure 5:
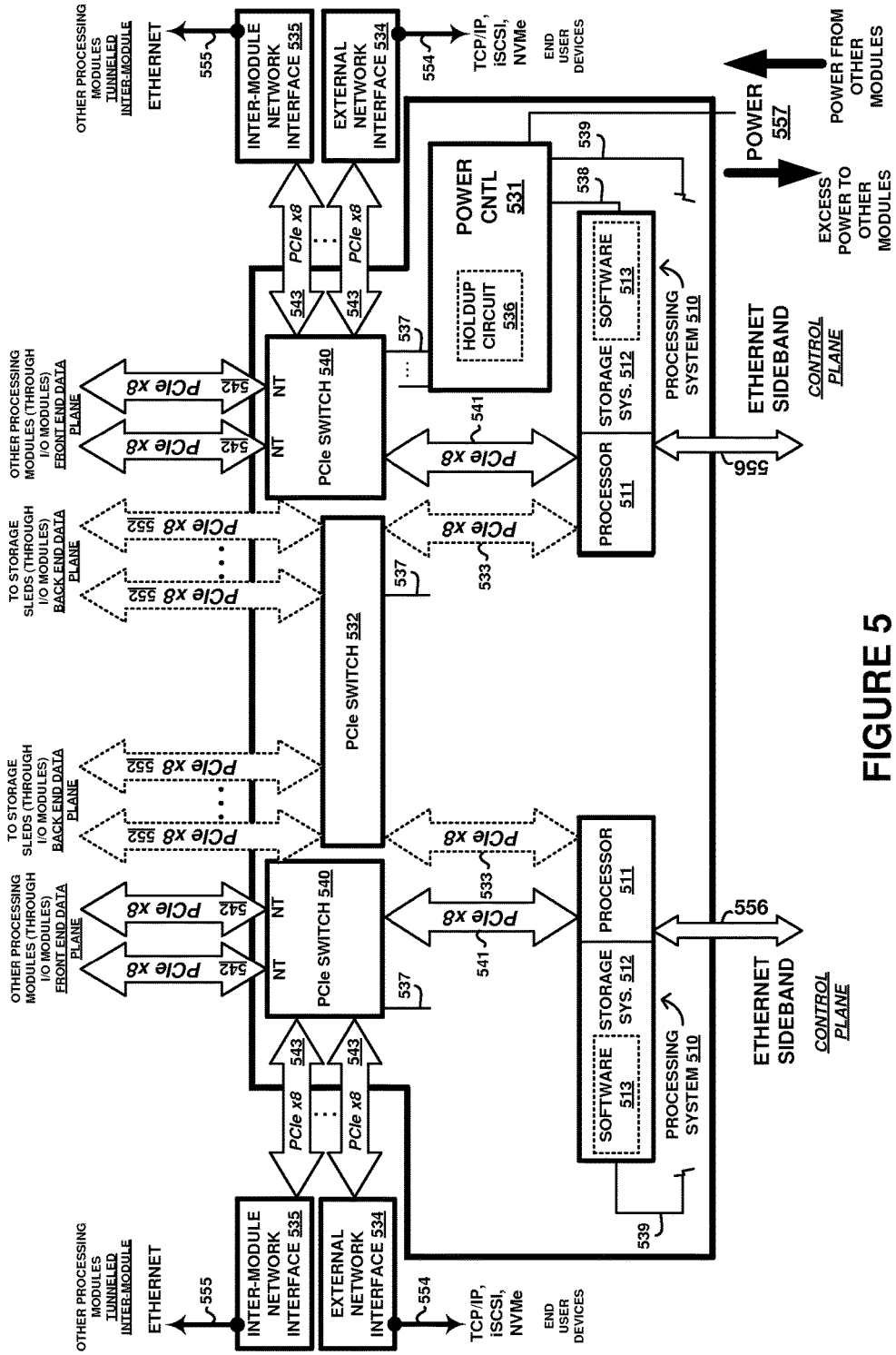
FIG. 5 is a block diagram illustrating a processing module.

FIG. 5 is a block diagram illustrating processing module 530, as an example of processing modules 130 of FIG. 1. Processing module 530 includes two or more processing systems 510, at least one PCIe switch 532, PCIe switches 540, network interfaces 534, power control module 535, and holdup circuit 536. Power control module 535 distributes power to each element of processing module 530 over associated power links 537-539. Power control module 535 can selectively enable/disable power for each power link. Further communication links can be included for intra-sled communication between the various elements of processing module 530.

Each processing system 510 further includes processor 511 and storage system 512. In some examples, network interfaces 534-535 are included in processing system 510, but network interfaces 534-535, or portions thereof, can be provided by separate circuitry and elements, such as separate PCIe expansion cards. Each processing system 510 can send and receive storage operations, such as storage packets over any of network interfaces 534-535, such as from external systems, end user devices, or from other processing systems of a cluster.

Each processor can communicate over an associated Ethernet sideband signaling link 556, such as with various microprocessors/controllers or power control nodes on other sleds or with interconnect, interposer, or control modules to retrieve statistical data or usage information. Links 556 can comprise Ethernet interfaces, or can comprise SMBus, JTAG, I2C, CAN, or any other communication interfaces, and in some examples is provided over separate links. Links 556 can be provided using external network interfaces, such as network interface cards or adapters communicatively coupled over ones of PCIe links 543. Each processor 511 also includes at least one PCIe interface, such as a PCIe transceiver and communication circuitry for communicating over associated PCIe links 533 and 541. The PCIe interface of each processor 511 can include a large number of PCIe lanes which are subdivided between narrower PCIe links, such as a ×16 interface that is subdivided among two ×8 links. In some examples, the PCIe interfaces are integrated into a single-chip die of processor 511. In other examples, the PCIe interface is provided over a separate microchip transceiver which can communicate with an associated processor 511 over another communication interface, such as a front-side bus of processor 511 or peripheral hub chip interface.

Processor 511 can comprise one or more microprocessors and other processing circuitry that retrieves and executes software 513 from storage system 512. Processor 511 can be implemented within a single processing device but can also be distributed across multiple processing devices or subsystems that cooperate in executing program instructions. Examples of processor 511 include general purpose central processing units, application specific processors, and logic devices, as well as any other type of processing device, combinations, or variations thereof. In some examples, processor 511 comprises an Intel or AMD microprocessor, ARM microprocessor, FPGA, ASIC, application specific processor, or other microprocessor or processing elements.

Storage system 512 can comprise any non-transitory computer readable storage media capable of storing software 513 that is executable by processor 511. Storage system 512 can include volatile and nonvolatile, removable and non-removable media implemented in any method or technology for storage of information, such as computer readable instructions, data structures, program modules, or other data. Storage system 512 can be implemented as a single storage device but can also be implemented across multiple storage devices or sub-systems co-located or distributed relative to each other. Storage system 512 can comprise additional elements, such as a controller, capable of communicating with processor 511. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 513 can be implemented in program instructions and among other functions can, when executed by processing system 510 in general or processor 511 in particular, direct processor 511 to operate as commanded by software 513. Software 513 can include processes, programs, or components, such as operating system software, database software, or application software. Software 513 can also comprise firmware or some other form of machine-readable processing instructions executable by elements of processing system 501, such as processor 511. Encoding software 513 on storage system 512 can transform the physical structure of storage system 512. The specific transformation of the physical structure can depend on various factors in different implementations of this description. Examples of such factors can include, but are not limited to the technology used to implement the storage media of storage system 512 and whether the computer-storage media are characterized as primary or secondary storage. For example, if the computer-storage media are implemented as semiconductor-based memory, software 513 can transform the physical state of the semiconductor memory when the program is encoded therein. For example, software 513 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Processing module 530 also interfaces with one or more network interfaces 534-535 to communicate over one or more associated network links 554-555. One or more network interfaces 534-535 are communicatively coupled to an associated processing system 510 or processor 511 via associated PCIe links 543 in FIG. 5. External access to processing module 530, and the storage sleds managed thereby, can be provided over ones of packet network links 554. Communication between processing modules or processors can be provided over ones of packet network links 555. In this example, packet network links 554-555 each comprises an Ethernet link for carrying various packet communications, such as Transmission Control Protocol/Internet Protocol (TCP/IP) communications, NVMe communications, or iSCSI communications, although other packet types can be employed. The network interfaces can comprise Ethernet interfaces, IP interfaces, T1 interfaces, or other local or wide area network communication interfaces which can communicate over a communication link. Examples of communication transceivers include network interface card equipment, receivers, transmitters, modems, and other communication circuitry. In some examples, network links 554 comprise a different bandwidth or transfer speed than network links 555.

PCIe switch 532 handles data plane or "back side" traffic for processing module 530 for storage and retrieval of data.

PCIe switch 532 communicates with storage sleds through one or more interconnect modules (not pictured) over PCIe links 552, and with ones of processors 531 over PCIe links 533. Each of links 552 and 533 comprises a PCIe link with eight lanes, namely a "×8" PCIe link. PCIe switch 532 also includes processing module cross connect links 553, which in this example are four ×8 PCIe links. This processing module cross connect 553 allows a PCIe 532 switch on another processing module to handle data plane traffic for any processing module for load balancing and bottleneck prevention. PCIe switch 532 also can include PCIe links 557 for further processing module cross connect. PCIe switch 532 comprises a PCIe cross connect switch for establishing switched connections between any PCIe interface handled by PCIe switch 532. In some examples, PCIe switch 532 comprises a PLX Technology PEX8796 24-port, 96 lane PCIe switch chip.

PCIe switches 540 handle control plane or "front side" traffic for processing module 530 for communications between processors of different processing modules. PCIe switches 540 communicate with other processing modules through one or more interconnect modules (not pictured) over PCIe links 542, and with ones of processors 531 over PCIe links 541. Each of links 542 and 541 comprises a PCIe link with eight lanes, namely a "×8" PCIe link. PCIe switches 540 also includes external module links 543, which in this example are four ×8 PCIe links. PCIe switches 540 comprise a PCIe cross connect switch for establishing switched connections between any PCIe interface handled by PCIe switches 540. In some examples, PCIe switches 540 each comprise a PLX Technology PEX8796 24-port, 96 lane PCIe switch chip.

Power control module 535 includes circuitry to selectively provide power to any of the elements of processing module 530. Power control module 535 can receive control instructions from a processor 511 over associated links 537-539 or additional communication links. In some examples, power control module 535 comprises processing elements discussed above for processor 320 of FIG. 3. Power control module 535 can receive power over power link 555 as a power source for the various elements of processing module 530. Holdup circuit 536 includes energy storage devices for storing power received over power link 555 for use during power interruption events, such as loss of source power. Holdup circuit 536 can include capacitance storage devices, such as an array of capacitors. Further discussion of examples of power control circuitry is found below.

As seen in FIG. 5, arrows indicate a bidirectional power flow over link 557. Power can be accepted by module 530 when input power is available, such as from a mating connector or midplane. Power can be redistributed to other modules by module 530 over link 557 when input power is not available, such as during power interruption events. When module 530 is removed from a mating connector, then power can be bled off into associated power sink circuitry. Although one power link 557 is shown, it should be understood that more than one link can be included, such as separate input and output links or separate links for different voltage levels.

FIG. 6 is a block diagram illustrating power control system 600. Power control system 600 can be included on any of the sleds or modules discussed herein, such as the power controller or holdup circuitry portions of the sleds and modules of FIG. 1, or the various modules of FIGS. 2-5, among others. Power control system 600 illustrates power controller 620, which can be an example of any of the power control modules or sled processor discussed herein, such as power control module 321 or processor 320 of FIG. 3, power control module 422 of FIG. 4, or power control module 531 of FIG. 5. Power controller 620 includes processor 621, communication interface 622, and power circuitry 623. Each of the elements of power controller 620 are communicatively coupled.

Communication interface 622 communicates over communication links 624, which can include any of the communication link protocols and types discussed herein. Communication interface 622 can include transceivers, network interface equipment, bus interface equipment, and the like. In operation, communication interface 622 receives control instructions from another processing unit over communication links 624. Communication links 624 also communicate with elements of the sled that power controller 620 is employed on. For example, on a storage sled, communication links 624 receive write data commit status of storage drives, power control instructions from other processors or processing systems, and can communicate over a PCIe interface or sideband communications of a PCIe interface.

Processor 621 includes any processor or processing system discussed herein, and controls the operations of power controller 620, such as initiating power up of sled elements, initiating power down of sled elements, monitoring usage statistics for a sled or for other sleds, including power system sleds and modules.

To further describe the circuitry and operation of processor 621, a detailed view is provided, although variations are possible. Processor 621 includes communication interface 640 and processing system 650. Processing system 650 includes processing circuitry 651, random access memory (RAM) 652, and storage 653, although further elements can be included. Example contents of storage 653 are further detailed by software modules 654-656.

Processing circuitry 651 can be implemented within a single processing device but can also be distributed across multiple processing devices or sub-systems that cooperate in executing program instructions. Examples of processing circuitry 651 include general purpose central processing units, microprocessors, application specific processors, and logic devices, as well as any other type of processing device. In some examples, processing circuitry 651 includes physically distributed processing devices, such as cloud computing systems.

Communication interface 640 includes one or more communication and network interfaces for communicating over communication networks or discrete links, such as communication interface 622, or further serial links, packet networks, the Internet, and the like. The communication interfaces can include one or more local or wide area network communication interfaces which can communicate over Ethernet or Internet protocol (IP) links. Communication interface 640 can include network interfaces configured to communicate using one or more network addresses, which can be associated with different network links. Examples of communication interface 640 include network interface card equipment, transceivers, modems, and other communication circuitry. Although communication interface 640 and communication interface 622 are both shown in FIG. 6, it should be understood that these can comprise different interfaces or combined into the same communication interface module, and can communicate over links 624.

RAM 652 and storage 653 together can comprise a non-transitory data storage system, although variations are possible. RAM 652 and storage 653 can each comprise any storage media readable by processing circuitry 651 and capable of storing software. RAM 652 can include volatile and nonvolatile, removable and non-removable media implemented in any method or technology for storage of information, such as computer readable instructions, data structures, program modules, or other data. Storage 653 can include non-volatile storage media, such as solid state storage media, flash memory, phase change memory, or magnetic memory, including combinations thereof. RAM 652 and storage 653 can each be implemented as a single storage device but can also be implemented across multiple storage devices or sub-systems. RAM 652 and storage 653 can each comprise additional elements, such as controllers, capable of communicating with processing circuitry 651.

Software stored on or in RAM 652 or storage 653 can comprise computer program instructions, firmware, or some other form of machine-readable processing instructions having processes that when executed a processing system direct processor 621 to operate as described herein. For example, software drives processor 621 to monitor operating statistics and status for various storage sleds and other modules, monitor power status for the sleds and modules, and instruct power circuitry 623 to control flow of holdup power or operational power, among other operations. The software can also include user software applications. The software can be implemented as a single application or as multiple applications. In general, the software can, when loaded into a processing system and executed, transform the processing system from a general-purpose device into a special-purpose device customized as described herein.

Software modules 654-656 each comprise executable instructions which can be executed by processor 621 for operating power controller 620 according to the operations discussed herein. Specifically, statistical monitor 654 monitors usage status or usage statistics for elements of sleds and modules. The usage statistics include data transfer rates of links, error rates of links, a cumulate number of errors of links, among other statistics. The usage statistics can be collected and stored by processor 621 in a data structure, such as a database or table and stored in storage 653, RAM 652, or other storage elements. Power monitor 655 monitors power inrush statistics during a power-up process, power status statistics, power active status, voltage levels, phase measurements, current draw, holdup circuit status or levels, sled/module insertion status, thermal levels, among other statistics. Power control 656 instructs power circuitry to power up or power down an associated sled or module responsive to statistical monitor 654 or power monitor 655, among other signals such as discrete signals monitored by power circuitry 623. Power control 656 can power up or power down a sled or module responsive to data commit status of associated storage drives or other circuitry, responsive to insertion status, or other factors.

Software modules 654-656 can reside in RAM 652 during execution and operation by processor 621, and can reside in storage space 653 during a powered-off state, among other locations and states. Software modules 654-656 can be loaded into RAM 652 during a startup or boot procedure as described for computer operating systems and applications.

Storage 653 can include one or more storage systems comprising flash memory such as NAND flash or NOR flash memory, phase change memory, magnetic memory, among other solid state storage technologies. As shown in FIG. 6, storage 653 includes software modules 654-656 stored therein. As described above, storage 653 can store software modules 654-656 in one or more non-volatile storage spaces during a powered-down state of processor 621, among other operating software, such as operating systems.

Processor 621 is generally intended to represent a computing system where at least software modules 654-656 are deployed and executed in order to render or otherwise implement the operations described herein. However, processor 621 can also represent any computing system on which at least software modules 654-656 can be staged and from where software modules 654-656 can be distributed, transported, downloaded, or otherwise provided to yet another computing system for deployment and execution, or yet additional distribution.

Power circuitry 623 includes various power control, voltage regulation, power holdup, and other circuitry. Power circuitry 623 receives power from a power source, such as off-sled power link 635, and distributes power to on-sled elements over ones of power links 625.

As a specific example of power circuitry 623, various elements are shown in FIG. 6. These elements include buck-boost module 631, flow control module 632, on-sled distribution module 633, holdup capacitors 634, and dummy load 635. Buck-boost module 631 comprises one or more switching power regulators that receive power from a power source, such as off-sled power link 635, and boosts a voltage associated with the power source to a holdup voltage for holdup capacitors 634. In this example, the power source is provided at +12 VDC and the holdup capacitors 634 are driven at +80 VDC. Buck-boost module 631 can also take the energy stored by holdup capacitors 634 and step-down the voltage to a lower voltage, such as 12 VDC for driving on-sled or off-sled elements using the energy stored in holdup capacitors 634. Processor 621 can communicate with buck-boost 631 to instruct buck-boost 631 to enter a buck mode or a boost mode. Buck-boost 631 can receive control signals or instructions from processor 621, such as over general purpose I/O of processor 621.

To control the flow of energy between on-sled power and holdup power, flow control module 632 is employed. Flow control module 632 includes various power switching elements, such as transistor switches, analog switches, solid state switches, diodes, and the like. When external off-sled power is available, such as over link 635, then flow control 632 can provide this power to on-sled distribution module 633 and to buck-boost module 631 for charging holdup capacitors 634. When external off-sled power is not available, then flow control 632 can allow power stored in holdup capacitors 634 and stepped-down by buck-boost module 631 to flow to on-sled distribution module 633 instead of off-sled power of link 635. Also, as discussed below, when excess energy remains in holdup capacitors 634 after an associated sled of power controller 620 has had all elements powered down and data committed, then this excess energy can be directed by flow control module 632 to off-sled consumers over link 635. In this manner, excess energy stored in holdup devices of power controller 620 can be used to provide power to other sleds or devices during a shutdown or commit process. The commit process includes writing any in-flight write data to non-volatile memory. The non-volatile memory can include storage drives of a storage sled, or can include separate non-volatile memory dedicated to power-down caching of in-flight data. If the associated sled of power controller 620 is instead removed from a chassis or midplane, then this excess energy of holdup capacitors 634 can be safely bled off using dummy load 635. Flow control module 632 can receive control signals or instructions from processor 621, such as over general purpose I/O of processor 621.

On-sled distribution module 633 includes various power flow and switching circuitry to direct electrical power to various elements of a sled, such as storage drives, PCIe switches, and the like, over links 625. Links 625 can comprise the various power links discussed herein for the various sleds. On-sled distribution module 633 includes various power switching elements, such as transistor switches, analog switches, solid state switches, diodes, and the like. On-sled distribution module 633 can receive control signals or instructions from processor 621, such as over general purpose I/O of processor 621.

Dummy load 635 can include resistive loads, such as heat dissipating electrical elements to bleed off excess energy of a holdup circuit, such as holdup capacitors 634. In some examples, dummy load 635 comprises a high-output light emitting diode (LED) which can efficiently bleed off excess energy using the light output of the LED. This LED can also indicate that energy still remains in the holdup circuit, warning a user of a particular sled that potentially dangerous or damaging voltages and energies might still exist on a sled. When a sled is inserted into a midplane, the LED is normally off. However, when a sled is removed from a midplane, then the LED would be instructed to illuminate and indicate that energy was being bled off of the sled using the LED. When the LED finally turned off, due to insufficient energy remaining on a sled, then the operator can know that dangerous or damaging voltages and energies no longer exist on the sled. If the LED cannot bleed all of the energy quickly enough, then additional resistive elements can be employed in parallel to assist the LED indicator.

Figure 7:
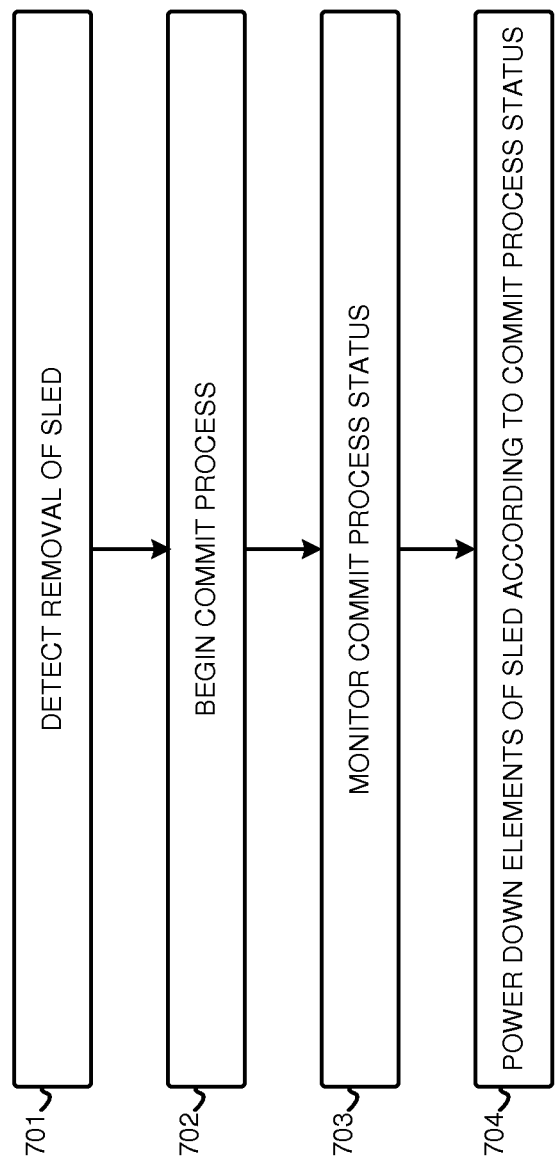
FIG. 7 is s flow diagram illustrating a method of operating a module.
Figure 8:
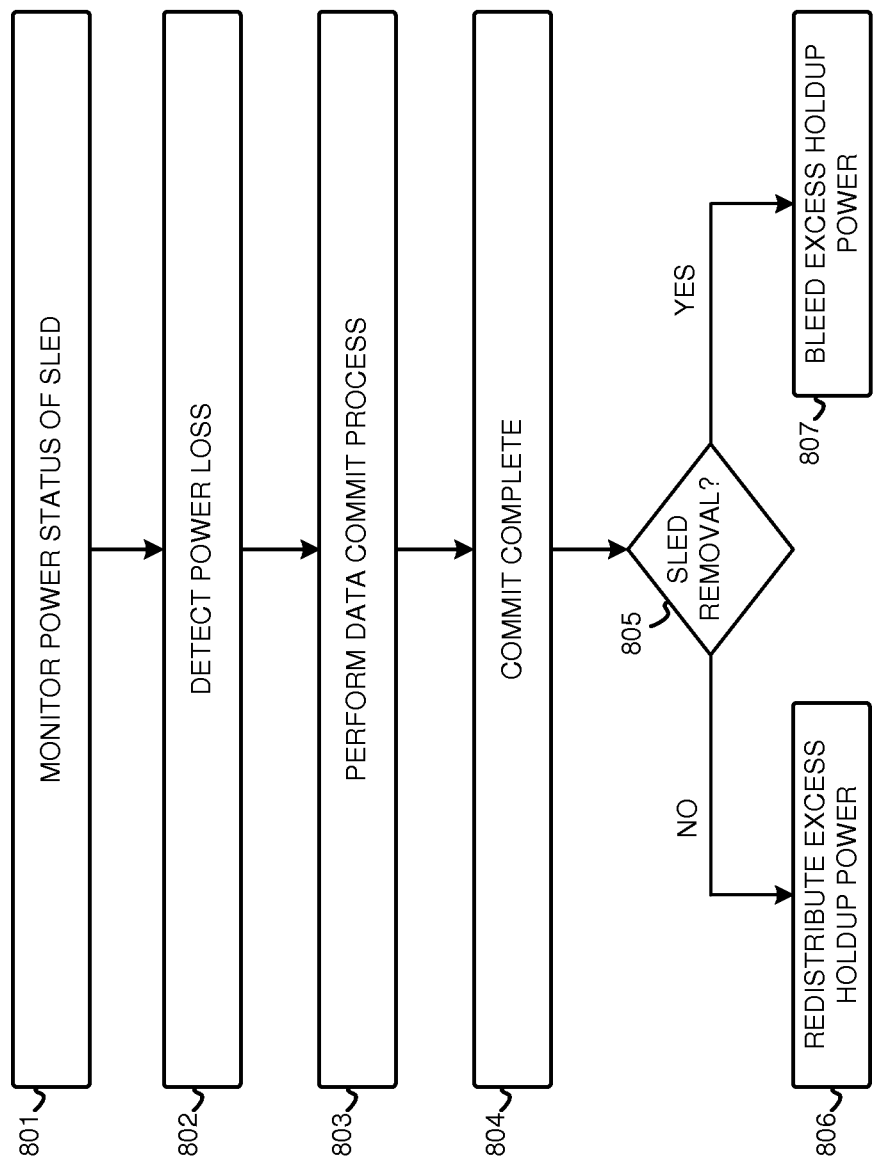
FIG. 8 is s flow diagram illustrating a method of operating a module.
Figure 9:
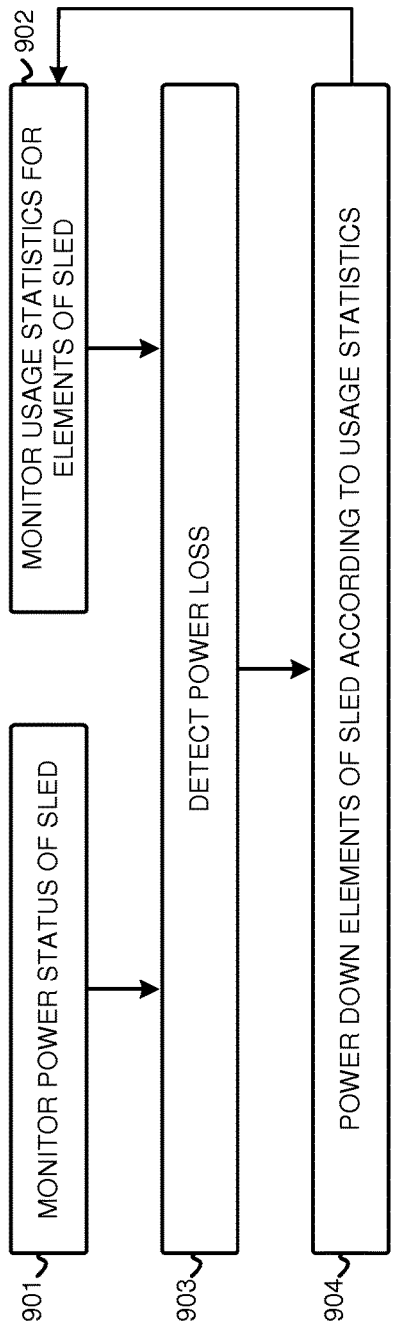
FIG. 9 is s flow diagram illustrating a method of operating a module.
Figure 10:
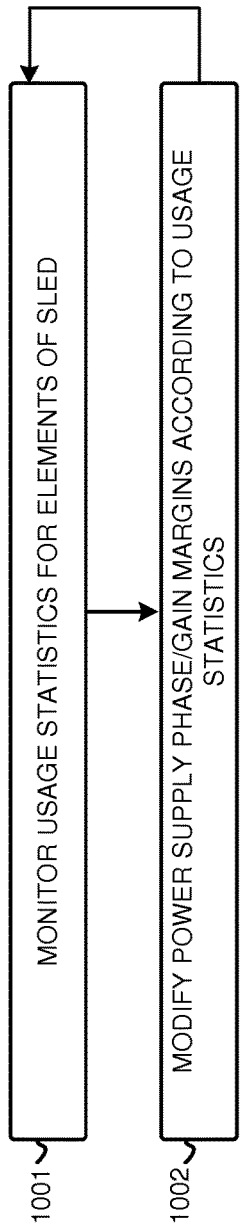
FIG. 10 is s flow diagram illustrating a method of operating a module.

To discuss the various power holdup, distribution, and handling operations of FIG. 6 as well as the various power controllers of the modules herein, FIGS. 7-10 are included. FIG. 7 discusses removal of a module from a midplane. FIG. 8 discusses the handling of power loss from a module, including from removal. FIG. 9 discusses powering module elements according to usage statistics. FIG. 10 discusses changing power characteristics according to usage statistics.

FIG. 7 is a flow diagram illustrating a method of operating a storage sled. The operations of FIG. 7 are discussed below in an exemplary storage sled, such as storage module 310 of FIG. 3. It should be understood that the operations of FIG. 7 can apply to any of the sleds or modules discussed herein, including storage sleds, interconnect modules, control modules, interposer modules, and processing modules, among others. Also, the operations of FIG. 7 are discussed in the context of a local processor or power controller, such as the elements of FIG. 6. It should be understood that the operations of FIG. 7 can be handled by a different controller, processor, or processing system, such as controller 321 or processor 320 of FIG. 3, processor 450 or controller 422 of FIG. 4, or processors 511-512 or controller 531 of FIG. 5, including combinations and variations thereof.

In FIG. 7, processor 320 detects (701) removal of sled 310. This removal can include sled 310 being physically removed from an associated midplane, such as midplane 240 of FIG. 2. In addition to detecting removal of sled 310, processor 320 can also detect power loss for a source power, such as provided over power link 323. Power loss flags or alerts can also be provided over any of sideband link 349 or PCIe link 340. In some examples, power loss of link 323 can be interpreted as a physical removal of sled 310. In other examples, various removal detection methods can be employed, such as pull-down or pull-up pins associated with sled 310 which can indicate physical mating of sled 310 with a socket or connector of an associated midplane.

Once removal or power loss is detected, processor 320 begins (702) a commit process for sled 310. The commit process ensures that data currently in-flight for storage into any of storage drives 311 is properly written to an associated storage drive 311 or to a temporary non-volatile memory of sled 310 during a power hold-up period. Data that has been received over PCIe switch 312 can be written to the associated storage drive 311 without loss of that data.

The commit process can include initially powering down PCIe switch 312 but still providing power to a buffer associated with sled 310 which data in-flight is placed before the data is committed to non-volatile memory, such as ones of storage drive 311. The buffers can be included in each storage drive 311, or in separate data buffer components. Processor 320 monitors (703) the commit process for each storage drive 311 and powers down individual ones of storage drives 311 once all write data has been committed to non-volatile storage of storage drive 311.

Thus, processor 320 powers down (704) elements of sled 310 according to the commit process status. Namely, PCIe switch 312 is first powered down after power loss is detected, and individual ones of storage drives 311 are powered down as each completes an associated commit process for buffered write data. Once all write data has been committed to non-volatile memory, processor 320 can power further elements such as processor 320 itself or power controller 321.

During the commit and power down process described above, holdup circuit 322 provides power to the individual elements of sled 310. Processor 320 communicates with power controller 321, such as over link 330 or another link, and instructs power controller 321 to selectively enable/disable power for the various elements of sled 310. Power controller 321 can employ solid state switches, transmission gates, solid state analog switches, transistor switches, or other power switching elements to selectively provide or remove power for the various elements of sled 310. Power controller 321 can also provide an input power status to processor 320 to indicate when input power is available.

Once input power is regained, such as by re-insertion of sled 310 into a midplane or after recovery of a source power, power controller 321 can apply power to processor 320. Processor 320 can proceed through a startup process, such as a boot process, and then instruct power controller 321 to selectively apply power to the other various elements of sled 310. These various elements of sled 310 can be powered up in a predetermined sequence to reduce inrush current over link 323. The predetermined sequence can include powering on individual ones of storage drives 311 in a sequential manner, then powering on PCIe switch, among other sequences.

FIG. 8 is s flow diagram illustrating a method of operating a storage sled. The operations of FIG. 8 are discussed below in an exemplary storage sled, such as storage module 310 of FIG. 3. It should be understood that the operations of FIG. 8 can apply to any of the sleds or modules discussed herein, including storage sleds, interconnect modules, interposer modules, control modules, and processing modules, among others. Also, the operations of FIG. 8 are discussed in the context of a local processor or power controller, such as the elements of FIG. 6. It should be understood that the operations of FIG. 8 can be handled by a different controller, processor, or processing system, such as controller 321 or processor 320 of FIG. 3, processor 450 or controller 422 of FIG. 4, or processors 511-512 or controller 531 of FIG. 5, including combinations and variations thereof.

In FIG. 8, processor 320 monitors (801) power status of sled 310 and detects (802) power loss of sled 310. This power loss can include removal of sled 310, such as sled 310 being physically removed from an associated midplane, such as midplane 240 of FIG. 2. In addition to detecting removal of sled 310, processor 320 can also detect power loss for a source power, such as provided over power link 323. Power loss flags or alerts can also be provided over any of sideband link 349 or PCIe link 340. In some examples, power loss of link 323 can be interpreted as a physical removal of sled 310. In other examples, various removal detection methods can be employed, such as pull-down or pull-up pins associated with sled 310 which can indicate physical mating of sled 310 with a socket or connector of an associated midplane.

Once removal or power loss is detected, processor 320 performs (803) a commit process for sled 310. The commit process ensures that data currently in-flight for storage into any of storage drives 311 is properly written to an associated storage drive 311 or to a temporary non-volatile memory of sled 310 during a power hold-up period. Data that has been received over PCIe switch 312 can be written to the associated storage drive 311 without loss of that data. The commit process can include initially powering down PCIe switch 312 but still providing power to a buffer associated with sled 310 which data in-flight is placed before the data is committed to non-volatile memory, such as ones of storage drive 311. The buffers can be included in each storage drive 311, or in separate data buffer components. Processor 320 monitors the commit process for each storage drive 311 and powers down individual ones of storage drives 311 once all write data has been committed to non-volatile storage of storage drive 311. Thus, processor 320 powers down elements of sled 310 according to the commit process status. Namely, PCIe switch 312 is first powered down after power loss is detected, and individual ones of storage drives 311 are powered down as each completes an associated commit process for buffered write data. Once all write data has been committed to non-volatile memory, processor 320 can power further elements such as processor 320 itself or power controller 321.

During the commit and power down process described above, holdup circuit 322 provides power to the individual elements of sled 310. Processor 320 communicates with power controller 321, such as over link 330 or another link, and instructs power controller 321 to selectively enable/disable power for the various elements of sled 310. Power controller 321 can employ solid state switches, transmission gates, solid state analog switches, transistor switches, or other power switching elements to selectively provide or remove power for the various elements of sled 310. Power controller 321 can also provide an input power status to processor 320 to indicate when input power is available.

Once the commit process is complete, processor 320 can operate in at least two different manners depending upon if the sled is removed or not (805) to cause the power loss. When the power loss status is not due to sled removal, such as due to loss of source power while the sled remains seated in an associated midplane, then power controller 321 redistributes (806) excess holdup power. This excess holdup power comprises energy remaining in any associated holdup circuit, such as holdup capacitors. A flow control circuit can direct energy from the holdup circuit to a link that feeds power off-sled. In some examples, such as in FIG. 6, the holdup circuit comprises an array of capacitors which are charged to a higher voltage than desired for an operating voltage of a sled. In this case, a buck-boost converter can be operated in a step-down mode to convert the high voltage of the holdup capacitors to a lower operating voltage, and a power flow control circuit can direct this energy too off-sled destinations or power busses. The redirected power can be used by other sleds to increase holdup time of the other sleds to complete shut down operations or data commit operations. A measurement of remaining energy in the holdup circuit can be monitored by processor 320 and information related to the remaining energy can be provided off-sled along with the power itself. In some examples, processor 320 is also powered down and thus only power flow, voltage step down, and holdup portions of power controller 321 are active during the power redistribution.

When the power loss is due to sled removal (807), then power controller 321 can bleed excess power of the holdup circuit. As discussed in FIG. 6, this power bleed can include resistive or LED elements, and ensures that dangerous or damaging energy is not left on a sled after removal from a midplane.

Once input power is regained, such as by re-insertion of sled 310 into a midplane or after recovery of a source power, power controller 321 can apply power to processor 320. Processor 320 can proceed through a startup process, such as a boot process, and then instruct power controller 321 to selectively apply power to the other various elements of sled 310. These various elements of sled 310 can be powered up in a predetermined sequence to reduce inrush current over link 323. The predetermined sequence can include powering on individual ones of storage drives 311 in a sequential manner, then powering on PCIe switch, among other sequences.

FIG. 9 is a flow diagram illustrating a method of operating a storage sled. The operations of FIG. 9 are discussed below in an exemplary storage sled, such as storage module 310 of FIG. 3. It should be understood that the operations of FIG. 9 can apply to any of the sleds or modules discussed herein, including storage sleds, interconnect modules, interposer modules, control modules, and processing modules, among others. Also, the operations of FIG. 9 are discussed in the context of a local processor or power controller, such as the elements of FIG. 6. It should be understood that the operations of FIG. 9 can be handled by a different controller, processor, or processing system, such as controller 321 or processor 320 of FIG. 3, processor 450 or controller 422 of FIG. 4, or processors 511-512 or controller 531 of FIG. 5, including combinations and variations thereof.

In FIG. 9, processor 320 monitors (901) power status of sled 310 and detects (903) power loss of sled 310. This power loss can include removal of sled 310, such as sled 310 being physically removed from an associated midplane, such as midplane 240 of FIG. 2. In addition to detecting removal of sled 310, processor 320 can also detect power loss for a source power, such as provided over power link 323. Power loss flags or alerts can also be provided over any of sideband link 349 or PCIe link 340. In some examples, power loss of link 323 can be interpreted as a physical removal of sled 310. In other examples, various removal detection methods can be employed, such as pull-down or pull-up pins associated with sled 310 which can indicate physical mating of sled 310 with a socket or connector of an associated midplane.

In FIG. 9, processor 320 also monitors (902) usage status or usage statistics for elements of sled 310. These elements include any of storage drive 311, PCIe switch 312, processor 320, power control node 321, holdup circuitry 322, or any of the various links and communication interfaces. The usage statistics include data transfer rates of PCIe links, error rates of PCIe links, a cumulate number of errors of PCIe links, sled insertion status, thermal levels of elements of sled 310, among other statistics, including those statistics received from another sled (such as a processing module). The usage statistics can include inrush statistics provided by power controller 321, such as during a power-up process or storage module 310. The usage statistics can include power status statistics monitored by power controller 321, such as a power active status, voltage levels, phase measurements, current draw, holdup circuit status or level, among other statistics. The usage statistics can be collected and stored by processor 320 in a storage system associated with processor 320, such as RAM, flash memory, or other storage systems.

The usage statistics can be employed in power down and power up processes such as discussed above in FIGS. 7-9. However, the usage statistics can also be used to control power usage (904) during normal operation of sled 310. For example, when usage statistics indicate that a particular storage drive 311 is dormant or is handling a quantity of transactions that fall below a transaction threshold level, then that storage drive can have an associated operational property modified. This property can include reducing a speed or interface property of a PCIe interface. Processor 320 can disable a subset of the PCIe lanes of a particular storage drive 311 to reduce power consumption of that storage sled, such as by reducing the number of active lanes from ×4 to ×1. Processor 320 can reduce a bus speed or clock speed of a PCIe interface of storage drive 311, such as by reducing a throughput from 8 GB/s to 4 GB/s or 1 GB/s. Other performance scaling can occur based on the usage of elements of sled 310 as monitored by processor 320. These usage and performance statistics can be provided to a processing module for further collection, storage, and processing. Furthermore, instructions for power up/down and performance scaling can be received from a processing module based at least on these provided statistics, among other operations.

Additionally, the usage statistics can be employed to selectively power down elements of a particular sled, such as powering down storage drives 311 when dormant or when activity levels drop below threshold levels according to the usage statistics. Many components or storage drives incorporate low power modes, such as idle modes. These idle modes can be enabled according to the usage statistics. However, even when in idle or low power modes, these storage drives still consume power. Processor 320 can monitor when these storage drives, or other sled elements, fall below a threshold activity level even if in the idle mode, and instruct power control node 321 to remove power from the associated sled elements. In some examples, when all storage drives 311 of a storage sled are powered down due to usage statistics for the storage drives falling below a threshold usage level, then any associated PCIe switch on the storage sled can also be powered down. Power up of the PCIe switch can occur when usage statistics rise above a threshold usage level, which can be a different usage level than the power down threshold.

FIG. 10 is s flow diagram illustrating a method of operating a storage sled. The operations of FIG. 10 are discussed below in an exemplary storage sled, such as storage module 310 of FIG. 3. It should be understood that the operations of FIG. 10 can apply to any of the sleds or modules discussed herein, including storage sleds, interconnect modules, interposer/control modules, and processing modules, among others. Also, the operations of FIG. 10 are discussed in the context of a local processor or power controller, such as the elements of FIG. 6. It should be understood that the operations of FIG. 10 can be handled by a different controller, processor, or processing system, such as controller 321 or processor 320 of FIG. 3, processor 450 or controller 422 of FIG. 4, or processors 511-512 or controller 531 of FIG. 5, including combinations and variations thereof.

In FIG. 10, processor 320 monitors (1001) usage status or usage statistics for elements of sled 310. These elements include any of storage drive 311, PCIe switch 312, processor 320, power control node 321, holdup circuitry 322, or any of the various links and communication interfaces. The usage statistics include data transfer rates of PCIe links, error rates of PCIe links, a cumulate number of errors of PCIe links, sled insertion status, thermal levels of elements of sled 310, among other statistics, including those statistics received from another sled (such as a processing module). The usage statistics can include inrush statistics provided by power controller 321, such as during a power-up process or storage module 310. The usage statistics can include power status statistics monitored by power controller 321, such as a power active status, voltage levels, phase measurements, current draw, holdup circuit status or level, among other statistics. The usage statistics can be collected and stored by processor 320 in a storage system associated with processor 320, such as RAM, flash memory, or other storage systems.

Processor 320 modifies (1002) power supply phase and gain margins according to at least the usage statistics. Power control node 321 can include various power supply electronics, such as power regulators, step up converters, step down converters, buck-boost converters, power factor correction circuits, among other power electronics. Typically, these power electronics must be tuned ahead of time for a particular load application, such as a maximum load anticipated for a particular sled. Various magnetic, solid state, and other electronic components are typically sized according to the maximum power draw for a particular application, and these components are permanently affixed to an associated circuit board, such as by soldering or sockets. In FIG. 10, the usage statistics are monitored to establish a present power draw for the various power electronics, such as a current supplied at a certain voltage by a buck-boost converter.

The various parameters of the power electronics can be altered according to the present power loading, such as by selecting among various magnetic components, such as inductors or transformers, adjusting resistive or capacitive components according to the present power loading, and the like. The alterations or adjustments can enable or disable various electronic components, such as using analog switches, low 'on' resistance transistor switches, or other selection methods. The alterations or adjustments can allow for power control node 321 to operate in a desired efficiency range, such as 90-98% efficiency. As the power load changes due to different usage of the various components of a sled, the pre-selected electrical components might lead to a lower efficiency. Based on these current usage statistics or power loading, processor 320 can instruct power control node 321 to alter component selections, modulation frequencies, pulse-width modulation factors, resistive/capacitive/inductive component usage, among other elements to maintain efficiency of a particular power electronic circuit in the desired efficiency range. These alterations or adjustments can bring phase margins or gain margins of the associated power electronics into the desired ranges. The phase and gain can be monitored by elements of power control node 321 or processor 320, including associated circuit elements, such as current sense resistors.

In some examples, the usage statistics, among other factors, are used to modify operating parameters of associated sled power electronics. However, these modifications might be used only when power loss is detected, to maximize efficient use of holdup circuitry. For example, if holdup capacitors are employed, the voltage provided by the holdup capacitors can drop as energy is drained from the holdup capacitors. As the voltage drops, the efficiency of a buck-boost converter might be reduced as well, since the input voltage provided by the holdup capacitors might fall below a threshold voltage level for efficient use of analog components related to the buck-boost converter. This holdup voltage can be monitored or be used as an input to an efficiency maximization circuit, which alters parameters or components associated with the buck-boost converter to ensure a desired or predetermined efficiency range or level is maintained. Once the voltage drops below a threshold operational level, the buck-boost converter can be disabled to prevent operating within an undesirably low voltage range, such as dictated by input voltage requirements of the particular power electronic components employed.

In addition to modifying properties of power supply circuitry in FIG. 10, operations from FIG. 9 can be performed. These operations can include using the usage statistics to selectively power down elements of a particular sled, such as powering down storage drives 311 when dormant or when activity levels drop below threshold levels according to the usage statistics.

Figure 11:
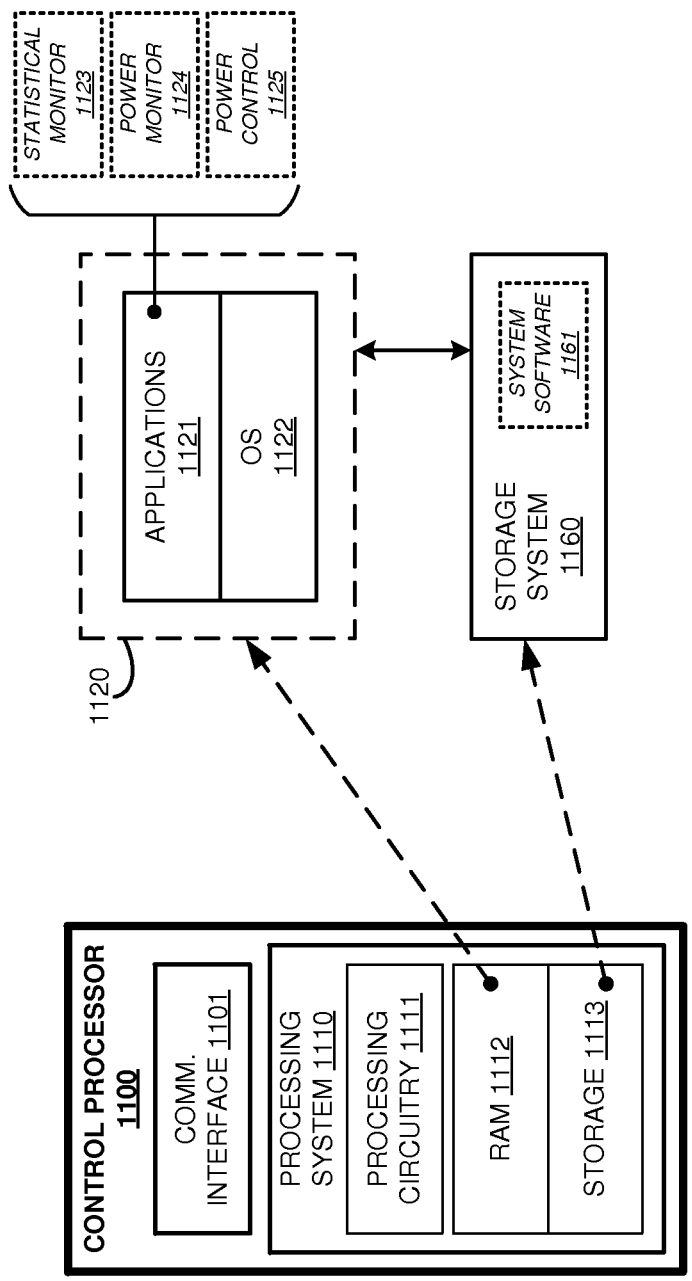
FIG. 11 is s block diagram illustrating a processing system.

FIG. 11 is s block diagram illustrating processing system 1100. Processing system 1100 illustrates an example of any of the power control modules or sled processors discussed herein, such as power control module 321 or processor 320 of FIG. 3, power control module 422 of FIG. 4, power control module 531 of FIG. 5, or processor 621 of FIG. 6. In addition, processing system 1100 can be illustrative of any processing system on a processing module, such as processing system 131 of FIG. 1, among others.

Control processor 1100 includes communication interface 1101 and processing system 1110. Processing system 1110 includes processing circuitry 1111, random access memory (RAM) 1112, and storage 1113, although further elements can be included. Example contents of RAM 1112 are further detailed in RAM space 1120, and example contents of storage 1113 are further detailed in storage system 1160.

Processing circuitry 1111 can be implemented within a single processing device but can also be distributed across multiple processing devices or sub-systems that cooperate in executing program instructions. Examples of processing circuitry 1111 include general purpose central processing units, microprocessors, application specific processors, and logic devices, as well as any other type of processing device. In some examples, processing circuitry 1111 includes physically distributed processing devices, such as cloud computing systems.

Communication interface 1101 includes one or more communication and network interfaces for communicating over communication links, networks, such as packet networks, the Internet, and the like. The communication interfaces can include serial links, such as SPI links, I2C links, USB links, UART links, or one or more local or wide area network communication interfaces which can communicate over Ethernet or Internet protocol (IP) links. Communication interface 1101 can include network interfaces configured to communicate using one or more network addresses, which can be associated with different network links. Examples of communication interface 1101 include network interface card equipment, transceivers, modems, and other communication circuitry.

RAM 1112 and storage 1113 together can comprise a non-transitory data storage system, although variations are possible. RAM 1112 and storage 1113 can each comprise any storage media readable by processing circuitry 1111 and capable of storing software. RAM 1112 can include volatile and nonvolatile, removable and non-removable media implemented in any method or technology for storage of information, such as computer readable instructions, data structures, program modules, or other data. Storage 1113 can include non-volatile storage media, such as solid state storage media, flash memory, phase change memory, or magnetic memory, including combinations thereof. RAM 1112 and storage 1113 can each be implemented as a single storage device but can also be implemented across multiple storage devices or sub-systems. RAM 1112 and storage 1113 can each comprise additional elements, such as controllers, capable of communicating with processing circuitry 1111.

Software stored on or in RAM 1112 or storage 1113 can comprise computer program instructions, firmware, or some other form of machine-readable processing instructions having processes that when executed a processing system direct control processor 1100 to operate as described herein. For example, software can drive processor 1100 to monitor operating statistics and status for various storage sleds and other modules, monitor power status for the sleds and modules, and instruct power circuitry to control flow of holdup power or operational power, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 1120 illustrates a detailed view of an example configuration of RAM 1112. It should be understood that different configurations are possible. RAM space 1120 includes applications 1121 and operating system (OS) 1122. Software applications 1123-1125 each comprise executable instructions which can be executed by processor 1100 for operating a power controller or other circuitry according to the operations discussed herein. Specifically, statistical monitor 1123 monitors usage status or usage statistics for elements of sleds and modules. The usage statistics include data transfer rates of links, error rates of links, a cumulate number of errors of links, among other statistics. The usage statistics can be collected and stored by processor 1100 in a data structure, such as a database or table and stored in storage 1113, RAM 1112, or other storage elements. Power monitor 1124 monitors power inrush statistics during a power-up process, power status statistics, power active status, voltage levels, phase measurements, current draw, holdup circuit status or levels, sled/module insertion status, thermal levels, among other statistics. Power control 1125 instructs power circuitry to power up or power down an associated sled or module responsive to statistical monitor 1123 or power monitor 1124, among other signals such as discrete signals monitored by associated power circuitry. Power control 1125 can power up or power down a sled or module responsive to data commit status of associated storage drives or other circuitry, responsive to insertion status, or other factors.

Applications 1121 and OS 1122 can reside in RAM space 1120 during execution and operation of control processor 1100, and can reside in storage system 1160 during a powered-off state, among other locations and states. Applications 1121 and OS 1122 can be loaded into RAM space 1120 during a startup or boot procedure as described for computer operating systems and applications.

Storage system 1160 illustrates a detailed view of an example configuration of storage 1113. Storage system 1160 can comprise flash memory such as NAND flash or NOR flash memory, phase change memory, magnetic memory, among other solid state storage technologies. As shown in FIG. 11, storage system 1160 includes system software 1161. As described above, system software 1161 can be in a non-volatile storage space for applications and OS during a powered-down state of control processor 1100, among other operating software.

Control processor 1100 is generally intended to represent a computing system with which at least software 1161 and 1121-1125 are deployed and executed in order to render or otherwise implement the operations described herein. However, control processor 1100 can also represent any computing system on which at least software 1161 and 1121-1125 can be staged and from where software 1161 and 1121-1125 can be distributed, transported, downloaded, or otherwise provided to yet another computing system for deployment and execution, or yet additional distribution.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage assembly, comprising:
a plurality of storage drives each comprising a drive Peripheral Component Interconnect Express (PCIe) interface and solid state storage media, with each of the plurality of storage drives configured to store and retrieve data responsive to storage operations received over the associated drive PCIe interface;
a PCIe switch circuit coupled to the drive PCIe interfaces of the plurality of storage drives and configured to receive the storage operations issued by one or more host systems over a shared PCIe interface and transfer the storage operations for delivery to the plurality of storage drives over selected ones of the drive PCIe interfaces;
a control processor configured to monitor activity levels of the drive PCIe interfaces of the plurality of storage drives;
the control processor configured to alter properties of the drive PCIe interfaces for one or more of the plurality of storage drives based at least on the activity levels of the one or more of the plurality of storage drives, wherein the properties of the drive PCIe interfaces comprise one or more of a quantity of active PCIe lanes and a PCIe throughput; and
the control processor configured to instruct power control circuitry to provide power to the one or more of the plurality of storage drives based at least on activity levels of the drive PCIe interfaces of the one or more of the plurality of storage drives being above a threshold activity level, and instruct the power control circuitry to remove the power from the one or more of the plurality of storage drives based at least on the activity levels indicating the one or more of the plurality of storage drives are dormant.

2. The data storage assembly of claim 1, further comprising:
the control processor configured to identify when input power is lost to the data storage assembly;
holdup circuitry configured to provide power to at least the plurality of storage drives after input power is lost to the data storage assembly; and
the control processor configured to instruct the holdup circuitry to provide the power to at least the plurality of storage drives based at least on the activity levels of the plurality of storage drives.

3. The data storage assembly of claim 1, wherein the activity levels comprise PCIe traffic directed to the one or more of the plurality of storage drives over the shared PCIe interface.

4. The data storage assembly of claim 1, comprising:
when all of the plurality of storage drives of the data storage assembly have the power removed, then the control processor configured to instruct the power control circuitry to remove the power from the PCIe switch circuit.

5. The data storage assembly of claim 1, comprising:
after the plurality of storage drives of the data storage assembly have had the power removed, based at least on the activity levels rising above the threshold activity level for at least one of the plurality of storage drives, the control processor configured to instruct the power control circuitry to apply power to the PCIe switch circuit and the at least one the plurality of storage drives.

6. The data storage assembly of claim 1, comprising:
responsive to removing the power from the one or more of the plurality of storage drives, the power control circuitry configured to adjust at least one of a phase margin and gain margin of the power control circuitry according to a projected load of remaining powered ones of the plurality of storage drives.

7. The data storage assembly of claim 1, comprising:
responsive to removing power from the one or more of the plurality of storage drives, the power control circuitry configured to select circuit components among the power control circuitry for use by the power control circuitry to establish a predetermined efficiency for the power control circuitry.

8. A method of operating a data storage assembly, the method comprising:
in a plurality of storage drives each comprising a drive Peripheral Component Interconnect Express (PCIe) interface and solid state storage media, storing and retrieving data responsive to storage operations received over an associated drive PCIe interface;
in a PCIe switch circuit coupled to the drive PCIe interfaces of the plurality of storage drives, receiving the storage operations issued by one or more host systems over a shared PCIe interface and transferring the storage operations for delivery to the plurality of storage drives over selected ones of the drive PCIe interfaces;
monitoring activity levels of the drive PCIe interfaces of the plurality of storage drives;
altering properties of the drive PCIe interfaces for ones of the plurality of storage drives based at least on the activity levels of the ones of the plurality of storage drives, wherein the properties of the drive PCIe interfaces comprise one or more of a quantity of active PCIe lanes and a PCIe throughput; and
instructing power control circuitry to provide power to the one or more of the plurality of storage drives based at least on the activity levels of the drive PCIe interfaces of the one or more of the plurality of storage drives being above a threshold activity level, and instructing the power control circuitry to remove the power from the one or more of the plurality of storage drives based at least on the activity levels indicating the ones of the plurality of storage drives are dormant.

9. The method of claim 8, further comprising:
identifying when input power is lost to the data storage assembly;
in holdup circuitry, providing the power to at least the plurality of storage drives after the input power is lost to the data storage assembly based at least on the activity levels of the plurality of storage drives.

10. The method of claim 8, wherein the activity levels comprise PCIe traffic directed to the one or more of the plurality of storage drives over the shared PCIe interface.

11. The method of claim 8, further comprising:
when all of the plurality of storage drives of the data storage assembly have the power removed, instructing the power control circuitry to remove power from the PCIe switch circuit.

12. The method of claim 8, further comprising:
after the plurality of storage drives of the data storage assembly have had the power removed, based at least on the activity levels rising above threshold activity level for at least one of the plurality of storage drives, instructing the power control circuitry to apply power to the PCIe switch circuit and the least one of the plurality of storage drives.

13. The method of claim 8, further comprising:
responsive to removing power from the one or more of the plurality of storage drives, adjusting at least one of a phase margin and gain margin of the power control circuitry according to a projected load of remaining powered ones of the plurality of storage drives.

14. The method of claim 8, further comprising:
responsive to removing power from the one or more of the plurality of storage drives, selecting circuit components among the power control circuitry for use by the power control circuitry to establish a predetermined efficiency for the power control circuitry.

15. A data storage module, comprising:
a plurality of storage drives each configured to store and retrieve data responsive to storage operations received over associated drive interfaces;
communication circuitry coupled to the drive interfaces of the plurality of storage drives and configured to receive the storage operations issued by one or more host systems over a shared interface and transfer the storage operations for delivery to the plurality of storage drives over selected ones of the drive interfaces;
control circuitry configured to monitor activity levels of the drive interfaces of each of the plurality of storage drives;
the control circuitry further configured to alter properties of the drive interfaces for one or more of the plurality of storage drives based at least on the activity levels of the one or more of the plurality of storage drives, wherein properties of the drive interfaces comprise one or more of a quantity of active lanes of the drive interface and a throughput of the drive interface; and
the control circuitry configured to provide power to the one or more of the plurality of storage drives based at least on the activity levels of the drive interfaces of the one or more of the plurality of storage drives being above a threshold activity level, and remove power from the one or more of the plurality of storage drives based at least on the activity levels indicating the one or more of the plurality of storage drives are dormant.

16. The data storage module of claim 15, comprising:
the control circuitry further configured to identify when input power is lost to the data storage assembly, and provide holdup power to at least the plurality of storage drives after the input power is lost to the data storage assembly based at least on the activity levels of the plurality of storage drives.

17. The data storage module of claim 15, further comprising:
responsive to removing power from the one or more of the plurality of storage drives, the control circuitry configured to adjust at least one of a phase margin and gain margin of the control circuitry according to a projected load of remaining powered ones of the plurality of storage drives.

18. A data storage assembly, comprising:
a plurality of storage drives each comprising a drive interface and storage media, with each of the plurality of storage drives configured to store and retrieve data responsive to storage operations received over the associated drive interface;
a switch circuit coupled to the drive interfaces of the plurality of storage drives and configured to receive the storage operations issued by one or more host systems over a shared interface and transfer the storage operations for delivery to the plurality of storage drives over selected ones of the drive interfaces;
a control processor configured to monitor activity levels of the drive interfaces of the plurality of storage drives;
the control processor configured to instruct power control circuitry to provide power to the one or more of the plurality of storage drives based at least on activity levels of the drive interfaces of the one or more of the plurality of storage drives being above a threshold activity level, and instruct the power control circuitry to remove the power from the one or more of the plurality of storage drives based at least on the activity levels indicating the one or more of the plurality of storage drives are dormant; and
responsive to removing the power from the one or more of the plurality of storage drives, the power control circuitry configured to adjust at least one of a phase margin and gain margin of the power control circuitry according to a projected load of remaining powered ones of the plurality of storage drives.

19. A method of operating a data storage assembly, the method comprising:
in a plurality of storage drives each comprising a drive interface and storage media, storing and retrieving data responsive to storage operations received over an associated drive interface;
in a switch circuit coupled to the drive interfaces of the plurality of storage drives, receiving the storage operations issued by one or more host systems over a shared interface and transferring the storage operations for delivery to the plurality of storage drives over selected ones of the drive interfaces;
monitoring activity levels of the drive interfaces of the plurality of storage drives;
instructing power control circuitry to provide power to the one or more of the plurality of storage drives based at least on the activity levels of the drive interfaces of the one or more of the plurality of storage drives being above a threshold activity level, and instructing the power control circuitry to remove the power from the one or more of the plurality of storage drives based at least on the activity levels indicating the ones of the plurality of storage drives are dormant; and responsive to removing power from the one or more of the plurality of storage drives, adjusting at least one of a phase margin and gain margin of the power control circuitry according to a projected load of remaining powered ones of the plurality of storage drives.

20. A data storage module, comprising:

a plurality of storage drives each configured to store and retrieve data responsive to storage operations received over associated drive interfaces;

communication circuitry coupled to the drive interfaces of the plurality of storage drives and configured to receive the storage operations issued by one or more host systems over a shared interface and transfer the storage operations for delivery to the plurality of storage drives over selected ones of the drive interfaces;

control circuitry configured to monitor activity levels of the drive interfaces of each of the plurality of storage drives;

the control circuitry configured to provide power to the one or more of the plurality of storage drives based at least on the activity levels of the drive interfaces of the one or more of the plurality of storage drives being above a threshold activity level, and remove power from the one or more of the plurality of storage drives based at least on the activity levels indicating the one or more of the plurality of storage drives are dormant; and responsive to removing power from the one or more of the plurality of storage drives, the control circuitry configured to adjust at least one of a phase margin and gain margin of the control circuitry according to a projected load of remaining powered ones of the plurality of storage drives.

* * * * *